United States Patent
Mcdaniel et al.

(10) Patent No.: US 11,629,296 B2
(45) Date of Patent: *Apr. 18, 2023

(54) DEMULSIFYING COMPOSITIONS AND METHODS OF USE

(71) Applicant: BL Technologies, Inc., Minnetonka, MN (US)

(72) Inventors: Cato Russell Mcdaniel, Montgomery, TX (US); Venkatesan Mani, Karnataka (IN); Nimeshkumar Kantilal Patel, The Woodlands, TX (US); Mohan Kr, Karnataka (IN); Kurt Jason Ginsel, The Woodlands, TX (US); Karl Douglas Kuklenz, The Woodlands, TX (US); Roberto Manuel Gutierrez, The Woodlands, TX (US)

(73) Assignee: BL Technologies, Inc., Minnetonka, MN (US)

( * ) Notice: Subject to any disclaimer, the term of this patent is extended or adjusted under 35 U.S.C. 154(b) by 377 days.

This patent is subject to a terminal disclaimer.

(21) Appl. No.: 14/419,246

(22) PCT Filed: Jul. 25, 2013

(86) PCT No.: PCT/US2013/052019
§ 371 (c)(1),
(2) Date: Feb. 3, 2015

(87) PCT Pub. No.: WO2014/028193
PCT Pub. Date: Feb. 20, 2014

(65) Prior Publication Data
US 2015/0307788 A1 Oct. 29, 2015

(30) Foreign Application Priority Data

Dec. 21, 2012 (IN) .......................... 3955/DEL/2012

(51) Int. Cl.
*C10G 33/04* (2006.01)
*B01D 17/04* (2006.01)
*C09K 23/00* (2022.01)

(52) U.S. Cl.
CPC .......... *C10G 33/04* (2013.01); *B01D 17/047* (2013.01); *C09K 23/00* (2022.01)

(58) Field of Classification Search
CPC . C10G 33/04; C10G 2300/1033; C08L 61/14; C08L 43/00; C08L 71/02; B01D 17/047; B01D 17/04; C08K 3/16; C08K 5/06; C09K 3/00
See application file for complete search history.

(56) References Cited

U.S. PATENT DOCUMENTS

| | | |
|---|---|---|
| 1,617,739 A | 2/1927 | Averill |
| 2,233,383 A | 2/1941 | De Groote et al. |
| 2,454,545 A | 11/1948 | Bock et al. |
| 2,499,365 A | 3/1950 | De Groote et al. |
| 2,499,370 A * | 3/1950 | Keiser .................... C10G 33/04 516/183 |
| 2,615,653 A | 10/1952 | Atkins et al. |
| 2,615,853 A | 10/1952 | Kirkpatrick et al. |
| 2,754,271 A | 7/1956 | Kirkpatrick |
| 2,792,353 A | 5/1957 | De Groote et al. |
| 2,888,403 A | 5/1959 | De Groote et al. |
| 3,497,006 A | 2/1970 | Jones et al. |
| 3,499,847 A | 3/1970 | Mange et al. |
| 3,506,070 A | 4/1970 | Jones |
| 3,522,179 A * | 7/1970 | Suer ..................... C10M 129/95 508/486 |
| 3,708,522 A | 1/1973 | Lesuer |
| 3,740,421 A | 6/1973 | Schmolka |
| 3,928,194 A | 12/1975 | Tao |
| 3,977,472 A | 8/1976 | Graham et al. |
| 4,032,514 A | 6/1977 | Buriks et al. |
| 4,058,453 A | 11/1977 | Patel et al. |
| 4,209,422 A | 6/1980 | Zimmerman et al. |
| 4,306,981 A * | 12/1981 | Blair, Jr. ............ B01D 11/0288 166/303 |
| 4,321,146 A | 3/1982 | Mccoy et al. |
| 4,321,147 A | 3/1982 | Mccoy et al. |
| 4,326,968 A | 4/1982 | Blair, Jr. |
| 4,342,657 A | 8/1982 | Blair, Jr. |
| 4,446,054 A | 5/1984 | Bessler |
| 4,537,701 A * | 8/1985 | Oppenlaender .......... C08G 8/36 210/708 |

(Continued)

FOREIGN PATENT DOCUMENTS

| | | |
|---|---|---|
| CA | 2168392 A1 | 7/1997 |
| CN | 1431276 A | 7/2003 |

(Continued)

OTHER PUBLICATIONS

Nour, A. H. et al. Water-in-crude oil emulsions: Its stabilization and demulsification. Journal of Applied Sciences, 2007, 7, 3512-3517. (Year: 2007).*
Definition of colloidal. IUPAC Compendium of Chemical Terminology. 2014. (Year: 2014).*
Definition of micelle. IUPAC Compendium of Chemical Terminology. 2014. (Year: 2014).*
Velasquez, I. et al. Tuning interfacial activity of polymeric resin-surfactant/n-alcohol solution interactions. J. Surfact. Deterg. 2016, 19, 1025-1032. (Year: 2016).*
Definition of alkyl. IUPAC Compendium of Chemical Terminology. 2014. (Year: 2014).*
Pluronic F68—Block Copolymer Surfactant, Technical Bulletin, BASF Corporation, 2004.
Pluronic L121—Block Copolymer Surfactant, Technical Bulletin, BASF Corporation, 2004.

(Continued)

*Primary Examiner* — Stephen E Rieth
(74) *Attorney, Agent, or Firm* — Armstrong Teasdale LLP

(57) ABSTRACT

Methods for resolving emulsions in a hydrocarbon stream by contacting the hydrocarbon stream with a demulsifying composition are disclosed. Demulsifying compositions for treating a hydrocarbon stream are also disclosed, wherein the demulsifying composition comprises at least one C4-C12 alkyl phenol-formaldehyde resin alkoxylate.

24 Claims, 13 Drawing Sheets

(56) References Cited

U.S. PATENT DOCUMENTS

| | | | |
|---|---|---|---|
| 4,737,265 | A | 4/1988 | Merchant, Jr. et al. |
| 4,800,039 | A | 1/1989 | Hassick et al. |
| 4,842,067 | A | 6/1989 | Balzer |
| 4,936,867 | A | 6/1990 | Guttierrez et al. |
| 5,032,285 | A | 7/1991 | Braden et al. |
| 5,080,779 | A | 1/1992 | Awbrey et al. |
| 5,120,428 | A | 6/1992 | Ikura et al. |
| 5,256,305 | A | 10/1993 | Hart |
| 5,282,959 | A | 2/1994 | Roling et al. |
| 5,449,463 | A | 9/1995 | Elliott et al. |
| 5,593,572 | A | 1/1997 | Hart |
| 5,607,574 | A | 3/1997 | Hart |
| 5,611,869 | A | 3/1997 | Hart |
| 5,681,451 | A | 10/1997 | Hart |
| 5,693,257 | A | 12/1997 | Hart |
| 5,759,409 | A | 6/1998 | Knauf et al. |
| 5,773,590 | A | 6/1998 | Hart |
| 5,921,912 | A * | 7/1999 | Hart ............ B01D 17/047 210/708 |
| 5,976,357 | A | 11/1999 | Stroem et al. |
| 6,103,100 | A | 8/2000 | Hart |
| 6,106,701 | A | 8/2000 | Hart |
| 6,120,678 | A | 9/2000 | Stephenson et al. |
| 6,228,239 | B1 | 5/2001 | Manalastas et al. |
| 6,294,093 | B1 | 9/2001 | Selvarajan et al. |
| 7,048,847 | B2 * | 5/2006 | Calvert ............ B01D 21/01 208/251 R |
| 7,160,470 | B2 | 1/2007 | Davis et al. |
| 7,285,519 | B2 | 10/2007 | Cox et al. |
| 7,771,588 | B2 | 8/2010 | Engel et al. |
| 8,168,062 | B2 | 5/2012 | Mcdaniel et al. |
| 9,260,601 | B2 * | 2/2016 | McDaniel ............ B01D 17/047 |
| 2003/0166497 | A1 | 9/2003 | Yang et al. |
| 2004/0247561 | A1 | 12/2004 | Seo et al. |
| 2006/0275342 | A1 | 12/2006 | Lindhardt et al. |
| 2007/0034571 | A1 | 2/2007 | Costa et al. |
| 2007/0111903 | A1 * | 5/2007 | Engel ............ B01D 17/047 507/261 |
| 2007/0112079 | A1 | 5/2007 | Mcdaniel et al. |
| 2009/0197978 | A1 | 8/2009 | Patel et al. |
| 2009/0205975 | A1 | 8/2009 | Tanahashi et al. |
| 2010/0078331 | A1 | 4/2010 | Scherson et al. |
| 2011/0011806 | A1 | 1/2011 | Ebert et al. |
| 2011/0031163 | A1 | 2/2011 | Byrne et al. |
| 2011/0253598 | A1 * | 10/2011 | McDaniel ............ B01D 17/047 208/188 |
| 2012/0172270 | A1 | 7/2012 | Dilsky |
| 2012/0261312 | A1 | 10/2012 | Flores et al. |

FOREIGN PATENT DOCUMENTS

| | | |
|---|---|---|
| CN | 101029252 A | 9/2007 |
| CN | 101463116 A | 6/2009 |
| CN | 101734756 A | 6/2010 |
| EP | 0222587 A1 | 5/1987 |
| EP | 2377910 A1 | 10/1987 |
| EP | 0509964 A1 | 10/1992 |
| EP | 2252385 A1 | 11/2010 |
| EP | 2377910 A1 | 10/2011 |
| WO | 0013762 A1 | 3/2000 |
| WO | 2009097061 A1 | 8/2009 |
| WO | 2011035854 A1 | 3/2011 |

OTHER PUBLICATIONS

Pluronic P84—Block Copolymer Surfactant, Technical Bulletin, BASF Corporation, 2004.

Tetronic 904—Block Copolymer Surfactant, Technical Bulletin, BASF Corporation, 2004.

Wu et al., "Effect of EO and PO positions in nonionic surfactants on surfactant properties and demulsification performance", Colloids and Surfaces A: Physicochem. Eng. Aspects, vol. No. 252, pp. 79-85, 2005.

Hawley's Condensed Chemical Dictionary, John Wiley & Sons, Inc. Online @ http://onlinelibrary.wiley.com/b00k/10.1002/9780470114735/ titles headwords = Colloid Chemistry (321), Colloidal Solution (321), Dispersion (471), Emulsion (499), Macromolecule (774-775), Micelle (847), Suspension (1197), downloaded Sep. 26, 2014), pp. 1-5, 2007.

Daiyin et al., "Application of a Testing Equipment with Optical Imaging for Interfacial Tension on Open Experimental Teaching", College of Petroleum Engineering, pp. 1-4, 2010.

"Embreak* 2W906", Emulsion Breaker, Fact Sheet, GE Power & Water, Water & Process Technologies, Feb. 2011.

"Imidazolines", Lakeland Laboratories Limited, pp. 1-8, Aug. 14, 2011.

"Embreak* 2W2014", Heavy Crude Oil Emulsion Breaker, Fact Sheet, GE Power & Water, Water & Process Technologies, Sep. 2011.

"Embreak* 2W2032", Crude Oil Emulsion Breaker, Fact Sheet, GE Power & Water, Water & Process Technologies, Sep. 2011.

"New Emulsion Breaker Technologies Ideal for Improving Desalter Performance", General Electric Company, http://www/gewater.com/misc/newsletters/articles/02-2011/emulsion.jsp, pp. 1-3, Mar. 2, 2012.

"Emulsion Breaking", GE Power & Water, Water & Process Technologies, General Electric Company, http://www.gewater.com/industries/refining_fuel/refining/ emulsion_breaking.jsp, pp. 1-2, Mar. 2, 2012.

Unofficial English Translation of Chinese Office Action issued in connection with corresponding CN Application No. 201380043238.6 dated Oct. 28, 2015.

U.S. Final Office Action issued in connection with related U.S. Appl. No. 13/627,685 dated Jun. 4, 2015.

Villamizar W. et al..: "CO2 corrosion inhibition by hydroxyethyl, aminoethyl, and amidoethyl imidazolines in water-oil mixtures", Journal of Solid State Electrochemistry; Current Research and Development in Science and Technology, Springer, Berlin, DE, vol. 11, No. 5, Oct. 12, 2006 (Oct. 12, 2006), pp. 619-629, XP019475168, ISSN: 1433-0768 the whole document.

International Search Report and Written Opinion issued in connection with corresponding application PCT/US2013/052019 dated Dec. 5, 2013.

Translation of Office Action dated Sep. 13, 2019 received in related Brazilian Patent Application No. BR 11 2015 002553-6; 2 pages.

Derwent Abstract, week 201448, London: Derwent Publications Ltd., AN 2011-M93989, Class A18, EP 2377910 A1 & U.S. Pat No. 8,168,062 B2, (General Electric Co), abstract, pp. 1-4, (2014).

Alexandridis et al., "Poly(ethylene oxide)-Poly(propylene oxide)-Poly(ethylene oxide) Block Copolymer Surfactants In Aqueous Solutions and At Interfaces: Thermodynamics, Structure, Dynamics And Modeling", Colloids and Surfaces A Physicochemical and Engineering Aspects, vol. No. 96, Issue No. 1-2, pp. 1-46, 1995.

Zaki et al., "Propylene Oxide-Ethylene Oxide Block Copolymers as Demulsifiers for Water-in-Oil Emulsions, I. Effect of Molecular Weight and Hydrophilic-Lipophylic Balance on the Demulsification Efficiency", Monatshefte fur Chemie Chemical Monthly, vol. No. 127, pp. 621-629, 1996.

Xu et al., "Effects of Demulsifier Structure On Desalting Efficiency of Crude Oils", Petroleum Science and Technology, vol. No. 24, Issue No. 6, pp. 673-688, 2006.

European Search Report and Opinion issued in connection with Related EP Application No. 11161824.5 dated Jul. 12, 2011.

* cited by examiner

DEMULSIFYING COMPOSITIONS AND METHODS OF USE

FIELD OF THE INVENTION

The present invention relates to compositions and processes for breaking emulsions in crude oil. More particularly, the compositions and processes may be used to break water-in-oil emulsions at an oilfield or in a desalter in a crude oil refinery.

BACKGROUND OF THE INVENTION

Crude oil is produced from geological formations where it is in intimate contact with brine (salt water). As the oil and brine are produced, their movement through geological formations produces an emulsion of water-in-oil, wherein tiny droplets of water are suspended in a continuous phase of oil. Generally, the amount of water produced from the formation in the oil field ranges from 1-2% and may even be higher than 90%. Refineries operate with much lower water content in the crude oil, generally not exceeding 0.5%.

In oilfield industries, these water-in-oil emulsions are often referred to as primary emulsions. Though less common, oil-in-water emulsions, wherein tiny droplets of oil are suspended in a continuous phase of water, also occur and are often referred to as reverse emulsions. Another type of emulsion is a multiple, or complex, emulsion where tiny droplets are suspended in bigger droplets that are suspended in a continuous phase.

To render the crude oil more suitable for refining, the crude oil is demulsified by separating the primary or reverse emulsions into separate oil and water phases. While the water in the oil is a problem for refiners, it is the dissolved salts which cause the most problems since they can deposit and foul heat transfer surfaces. Calcium chloride and magnesium chloride decompose at operating temperatures of the refinery to produce HCl (hydrochloric acid) which corrodes the distillation towers. To remove the brine and the salts it contains, the crude oil is heated to around 120° C. and mixed with about 5% fresh water by passing the water and oil through a mixing valve and thence to a vessel, such as an oil refinery desalter, where it has a residence time of about 30 minutes to allow the emulsion to break and the oil and water to separate.

Generally, the steps in demulsification are flocculation followed by coalescence and, finally, sedimentation. During the flocculation step, the suspended droplets aggregate to form larger droplets. During coalescence, the larger droplets come together to form a large drop. Sedimentation takes advantage of the fact that water is denser than oil. During sedimentation the water and oil phases become stratified into distinct layers as large drops of water fall to the bottom. There are several methods for demulsifying oil field emulsions, including thermal, mechanical, electrical, and chemical methods.

Chemical methods employ the use of chemicals that neutralize the effects of emulsion stabilizing agents and to accelerate the demulsification process by reducing the interfacial tension. These demulsifying chemicals are often referred to as emulsion "breakers" because they break, or separate the emulsions into the separate oil and water phases. Demulsifying chemicals used to break water-in-oil emulsions, or primary emulsions, are often referred to as primary emulsion breakers. Primary emulsion breakers are added to the continuous oil phase and are generally oil-soluble. Likewise, demulsifying chemicals used to break oil-in-water emulsions, or reverse emulsions, are often referred to as reverse emulsion breakers. Reverse emulsion breakers are generally water-soluble, though they may be oil-soluble, and are added to the continuous water phase. Some of the water is removed from the crude oil by adding surfactant chemicals to demulsify the water and oil at the well or near the point of production. These surfactants are optimized to separate, or "break", the oil and water at relatively low temperatures, common in the oil field.

Without emulsion breakers, more time is required to separate the phases, limiting the amount of oil the refinery can process. In some cases, for example when a multiple emulsion is present, crude oil applications require both primary and reverse emulsion breakers. As primary emulsion breakers generally are oil soluble and reverse emulsion breakers are generally water soluble, the two types of emulsion breakers do not mix and are added to the crude oil or to the wash water separately.

The most effective demulsifying chemistries and formulations typically vary with the crude composition. The crude composition, however, continuously varies based on the crude source or well, the treatment, if any, at the well, well stimulation practices, "smearing", or contamination effects from adjacent pipeline transports, and the crude blend composition. The crude composition may be further altered by a myriad of chemistries that may have been added to the crude between the time it is collected at the well and the time it enters a desalter at a refinery. Such chemistries may include, but are not limited to, corrosion inhibitors, biocides, drag reducers, $H_2S$ scavengers, etc.

Most of the effects on crude composition mentioned above are beyond a refinery's control, yet the refinery is often left with the burden of analyzing the crude composition and determining the most effective demulsifying treatment.

BRIEF DESCRIPTION OF THE INVENTION

It was surprisingly discovered, however, that blends of one or more $C_4$-$C_{12}$ alkyl phenol-formaldehyde resin alkoxylates with a surfactant produced a robust demulsifying composition that was effective at resolving emulsions in a variety of crude types.

Accordingly, in one embodiment, a method of resolving an emulsion present in a hydrocarbon stream is disclosed. The method may comprise contacting the hydrocarbon stream with a demulsifying composition. The demulsifying composition may comprise at least one $C_4$-$C_{12}$ alkyl phenol-formaldehyde resin alkoxylate, an oil phase, and an aqueous phase, wherein the oil and aqueous phases form a colloidal micellar solution. In another embodiment, the $C_4$-$C_{12}$ alkyl phenol-formaldehyde resin alkoxylate may have a polymerization number of 2-20 and a degree of alkoxylation greater than about 30% and less than about 90% relative to the weight of the resin.

In yet another embodiment, the demulsifying composition may comprise 0.1 wt % to about 90 wt % water based on a total weight of the demulsifying composition. Alternatively, the demulsifying composition may comprise 0.1 wt % to about 30 wt % water based on a total weight of said demulsifying composition.

In another embodiment, the $C_4$-$C_{12}$ alkyl phenol-formaldehyde resin alkoxylate may comprise at least two alkyl phenol-formaldehyde resin alkoxylates having different amounts of alkoxylation. The two alkyl phenol-formaldehyde resin alkoxylates may comprise a first alkyl phenol-formaldehyde resin alkoxylate, having a percent A by weight of alkoxylation, and a second alkyl phenol-formaldehyde resin alkoxylate, having a percent B by weight of alkoxylation, wherein A minus B is 10-50%. The ratio by weight of the first alkyl phenol-formaldehyde resin alkoxylate relative to the second alkyl phenol-formaldehyde resin alkoxylate may be 1:9 to 9:1.

In yet another method embodiment, the demulsifying composition may be added to the hydrocarbon stream in an amount ranging from about 1 to about 200 ppm by volume of the hydrocarbon stream.

In another embodiment, the demusifying composition may further comprise at least one polyalkylene oxide polyol with a degree of ethoxylation greater than about 30% and less than about 85% and a molecular weight ranging from about 1000 to about 25,000. The ratio by weight of the $C_4$-$C_{12}$ alkyl phenol-formaldehyde resin alkoxylate to the polyalkylene oxide polyol may range from about 1:9 to about 9:1. In yet another embodiment, at least one polyalkylene oxide polyol may comprise two polyalkylene oxide polyols, wherein at least one of the polyalkylene oxide polyols may be selected from the group consisting of ethylene oxide/propylene oxide block polymers, ethylenediamine alkoxylates, polyethylenimine alkoxylates, glycerol alkoxylates, trimethylpropane alkoxylates, and sorbitol alkoxylates.

In yet another embodiment, the first polyalkylene oxide polyol may be an ethylene oxide/propylene oxide block copolymer having the formula:

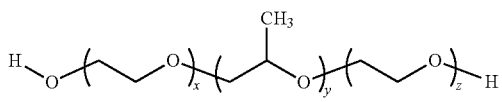

wherein x, y, and z are any integer greater than one, and the molecule has a molecular weight of 1000-9000. The second polyalkylene oxide polyol may be an oxide block copolymer having a molecular weight of 3000-25000 and 2-6 branches. Each branch may comprise at least one polyalkoxylate block.

In another embodiment, the demulsifying composition may further comprise a water-soluble reverse emulsion breaker and/or a water-soluble corrosion inhibitor. The reverse emulsion breaker may comprise at least one water-soluble polymer selected from the group consisting of polyamines and dialkyl diallyl ammonium polymers. In another embodiment, the reverse emulsion breaker may comprise aluminum chlorohydrate and poly(diallyldimethylammonium chloride). The poly(diallyldimethylammonium chloride) may have a molecular weight of about 100,000. The weight ratio of aluminum chlorohydrate to poly(diallyldimethylammonium chloride) may be about 9:1.

In yet another embodiment, the corrosion inhibitor may comprise at least one member selected from the group consisting of amidoethyl imidazoline, hydroxyethyl imidazoline, and aminoethyl imidazoline.

In another embodiment, the demulsifying composition may comprise at least one member selected from the group consisting of an acid, a non-polar organic solvent, a base, a wetting agent, and a dispersant. Suitable acids include, but are not limited to, acetic acid, citric acid, malic acid, maleic acid, succinic acid, glycolic acid, methane sulfonic acid, dodecylbenzenesulfonic acid, naphthalene sulfonic acid, and p-toluene sulfonic acid. Suitable non-polar organic solvents includes, but are not limited to, naphtha, light aromatic naphtha, heavy aromatic naphtha, pentane, cyclopentane, hexane, cyclohexane, benzene, ethyl benzene, 1,2,4-trimethyl benzene, 1,3,5-trimethyl benzene, toluene, xylene, cumene, 1,4-dioxane, chloroform, diethyl ether, methyl esters of fatty acids (biodiesel), and diethylene glycol butyl ether. Suitable bases include, but are not limited to, sodium hydroxide and potassium hydroxide. Suitable wetting agents include, but are not limited to sodium dioctyl sulfosuccinic acid and sodium dodecylbenzene sulfonic acid. Suitable dispersants include adducts of at least one mono- or polycarboxylic acid or anhydride and an acylating reagent. Suitable acylating reagents include, but are not limited to, fumaric acid, maleic anhydride, maleic acid, succinic anhydride, and succinic acid.

In yet another embodiment, the $C_4$-$C_{12}$ alkyl phenol-formaldehyde resin alkoxylate may comprise at least one member selected from the group consisting of: a) a mixed resin with units of nonylphenol formaldehyde alkoxylate and units of butylphenol formaldehyde alkoxylate; b) a resin with units of nonylphenol formaldehyde alkoxylate; and c) a resin with units of amylphenol formaldehyde alkoxylate.

In another method embodiment, the hydrocarbon stream may comprise crude oil.

In another embodiment, a demulsifying composition for treating a hydrocarbon stream is provided. The demulsifying composition may comprise at least one $C_4$-$C_{12}$ alkyl phenol-formaldehyde resin alkoxylate, an oil phase, and an aqueous phase, wherein the oil and aqueous phases form a colloidal micellar solution. The demulsifying composition may comprise 0.1 wt % to about 90 wt % water based on a total weight of said demulsifying composition.

In another embodiment, the $C_4$-$C_{12}$ alkyl phenol-formaldehyde resin alkoxylate may have a polymerization number of 2-20 and a degree of alkoxylation greater than about 30% and less than about 90% relative to the weight of the resin. In yet another embodiment, the demulsifying composition may comprise from about 0.1 wt % to about 30 wt % water, based on a total weight of said demulsifying composition.

In another embodiment, the $C_4$-$C_{12}$ alkyl phenol-formaldehyde resin alkoxylate comprises at least two alkyl phenol-formaldehyde resin alkoxylates having different amounts of alkoxylation. The two alkyl phenol-formaldehyde resin alkoxylates may comprise a first alkyl phenol-formaldehyde resin alkoxylate, having a percent A by weight of alkoxylation, and a second alkyl phenol-formaldehyde resin alkoxylate, having a percent B by weight of alkoxylation, wherein A minus B is 10-50%. The ratio by weight of an amount of the first alkyl phenol-formaldehyde resin alkoxylate relative to the second alkyl phenol-formaldehyde resin alkoxylate may be 1:9 to 9:1.

In yet another embodiment, the demulsifying composition may further comprise at least one polyalkylene oxide polyol with a degree of ethoxylation greater than about 30% and less than about 85% and a molecular weight ranging from about 1000 to about 25,000. The ratio by weight of the $C_4$-$C_{12}$ alkyl phenol-formaldehyde resin alkoxylate to the polyalkylene oxide polyol may range from about 1:9 to about 9:1. In another embodiment, the polyalkylene oxide polyol may comprise two polyalkylene oxide polyols, wherein one of the polyalkylene oxide polyols may be selected from the group consisting of ethylene oxide/propylene oxide block polymers, ethylenediamine alkoxylates, polyethylenimine alkoxylates, glycerol alkoxylates, trimethylpropane alkoxylates, and sorbitol alkoxylates.

In yet another embodiment, the first polyalkylene oxide polyol may be an ethylene oxide/propylene oxide block copolymer having the formula:

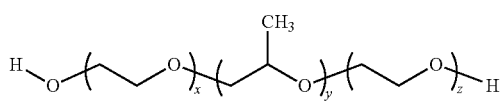

wherein x, y, and z are any integer greater than one, and the molecule has a molecular weight of 1000-9000. The second polyalkylene oxide polyol may be an oxide block copolymer having a molecular weight of 3000-25000 and 2-6 branches. Each branch may comprise at least one polyalkoxylate block.

In another embodiment, the aqueous phase may further comprise a water-soluble reverse emulsion breaker and/or a water-soluble corrosion inhibitor. Reverse emulsion breakers are materials that aid in flocculation or coalescence of crude-oil in water emulsions. As such, reverse emulsion breakers may be categorized as flocculants or coagulants. Coagulants are low molecular weight (<1 MM) polyamines, poly(diallyldimethylammonium chloride), acryloyloxyethyl trimethyl ammonium chloride/tannin polymers, quaternized starches, and melamine formaldehyde polymers. Flocculants are higher molecular weight (2-12 MM) polymers of acrylamide with poly(diallyldimethylammonium chloride) or acryloyloxyethyl trimethyl ammonium chloride. The reverse emulsion breaker may be present at about 0.5 wt % to about 10 wt % based on a total weight of the demulsifying composition. Alternatively, the reverse emulsion breaker may be present at about 0.5 wt % to about 5 wt % based on a total weight of the demulsifying composition. In one embodiment, the reverse emulsion breaker may comprise at least one water-soluble polymer selected from the group consisting of polyamines and dialkyl diallyl ammonium polymers. In yet another embodiment, the reverse emulsion breaker may comprise aluminum chlorohydrate and poly(diallyldimethylammonium chloride). The poly(diallyldimethylammonium chloride) may have a molecular weight of about 100,000. The weight ratio of aluminum chlorohydrate to poly(diallyldimethylammonium chloride) may be about 9:1. In yet another embodiment the corrosion inhibitor may comprise at least one member selected from the group consisting of amidoethyl imidazoline, hydroxyethyl imidazoline, and aminoethyl imidazoline. The corrosion inhibitor may be present at about 0.5 wt % to about 10 wt % based on a total weight of the demulsifying composition. Alternatively, the corrosion inhibitor may be present at about 0.5 wt % to about 5 wt % based on a total weight of the demulsifying composition.

In another embodiment, the demulsifying composition may further comprise at least one member selected from the group consisting of an acid, a non-polar organic solvent, a base, a wetting agent, and a dispersant. Suitable acids include, but are not limited to, acetic acid, citric acid, malic acid, maleic acid, succinic acid, glycolic acid, methane sulfonic acid, dodecylbenzenesulfonic acid, naphthalene sulfonic acid, and p-toluene sulfonic acid. Suitable non-polar organic solvents include, but are not limited to, naphtha, light aromatic naphtha, heavy aromatic naphtha, pentane, cyclopentane, hexane, cyclohexane, benzene, ethyl benzene, 1,2,4-trimethyl benzene, 1,3,5-trimethyl benzene, toluene, xylene, cumene, 1,4-dioxane, chloroform, diethyl ether, methyl esters of fatty acids (biodiesel), and diethylene glycol butyl ether. Suitable bases include, but are not limited to, sodium hydroxide and potassium hydroxide. Suitable wetting agents include, but are not limited to, sodium dioctyl sulfosuccinic acid and sodium dodecylbenzene sulfonic acid. Suitable dispersants include adducts of at least one mono- or polycarboxylic acid or anhydride and an acylating reagent. Suitable acylating reagents include, but are not limited to, fumaric acid, maleic anhydride, maleic acid, succinic anhydride, and succinic acid.

In another embodiment, the $C_4$-$C_{12}$ alkyl phenol-formaldehyde resin alkoxylate may comprise at least one member selected from the group consisting of: a) a mixed resin with units of nonylphenol formaldehyde alkoxylate and units of butylphenol formaldehyde alkoxylate; b) a resin with units of nonylphenol formaldehyde alkoxylate; and c) a resin with units of amylphenol formaldehyde alkoxylate.

In another embodiment, a method of resolving an emulsion present in a hydrocarbon stream is disclosed. The method may comprise contacting the hydrocarbon stream with a demulsifying composition. The demulsifying composition may comprise at least one $C_4$-$C_{12}$ alkyl phenol-formaldehyde resin alkoxylate, wherein the $C_4$-$C_{12}$ alkyl phenol-formaldehyde resin alkoxylate has a polymerization number of 2-20 and a degree of alkoxylation greater than about 30% and less than about 90% relative to the weight of the resin.

In yet another embodiment, at least one $C_4$-$C_{12}$ alkyl phenol-formaldehyde resin alkoxylate may comprise at least two alkyl phenol-formaldehyde resin alkoxylates having different amounts of alkoxylation. The two alkyl phenol-formaldehyde resin alkoxylates may comprise a first alkyl phenol-formaldehyde resin alkoxylate having a percent A by weight of alkoxylation and a second alkyl phenol-formaldehyde resin alkoxylate having a percent B by weight of alkoxylation, wherein A minus B is 10-50%. The ratio by weight the first alkyl phenol-formaldehyde resin alkoxylate relative to the second alkyl phenol-formaldehyde resin alkoxylate is 1:9 to 9:1.

In yet another method embodiment, the demulsifying composition may be added to the hydrocarbon stream in an amount ranging from about 1 to about 200 ppm by volume of the hydrocarbon stream.

In another embodiment, the demulsifying composition further comprises at least one polyalkylene oxide polyol with a degree of ethoxylation greater than about 30% and less than about 85% and a molecular weight ranging from about 1000 to about 25,000. The ratio by weight of the $C_4$-$C_{12}$ alkyl phenol-formaldehyde resin alkoxylate to the polyalkylene oxide polyol may range from about 1:9 to about 9:1.

In yet another embodiment, the polyalkylene oxide polyol may comprise at least two polyalkylene oxide polyols. One of the polyalkylene oxide polyols may be selected from the group consisting of ethylene oxide/propylene oxide block polymers, ethylenediamine alkoxylates, polyethylenimine alkoxylates, glycerol alkoxylates, trimethylpropane alkoxylates, and sorbitol alkoxylates. The first polyalkylene oxide polyol may be an ethylene oxide/propylene oxide block copolymer having the formula:

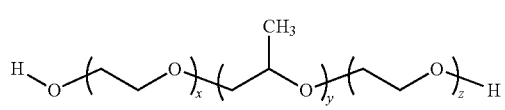

wherein x, y, and z are any integer greater than one, and the molecule has a molecular weight of 1000-9000. The second polyalkylene oxide polyol may be an oxide block copolymer having a molecular weight of 3000-25000 and 2-6 branches. Each branch may comprise at least one polyalkoxylate block.

In yet another embodiment, the $C_4$-$C_{12}$ alkyl phenol-formaldehyde resin alkoxylate may comprise at least one member selected from the group consisting of: a) a mixed resin with units of nonylphenol formaldehyde alkoxylate and units of butylphenol formaldehyde alkoxylate; b) a resin with units of nonylphenol formaldehyde alkoxylate; and c) a resin with units of amylphenol formaldehyde alkoxylate.

In another method embodiment, the hydrocarbon stream may comprise crude oil.

DETAILED DESCRIPTION OF EXEMPLARY EMBODIMENTS

Figure 1:
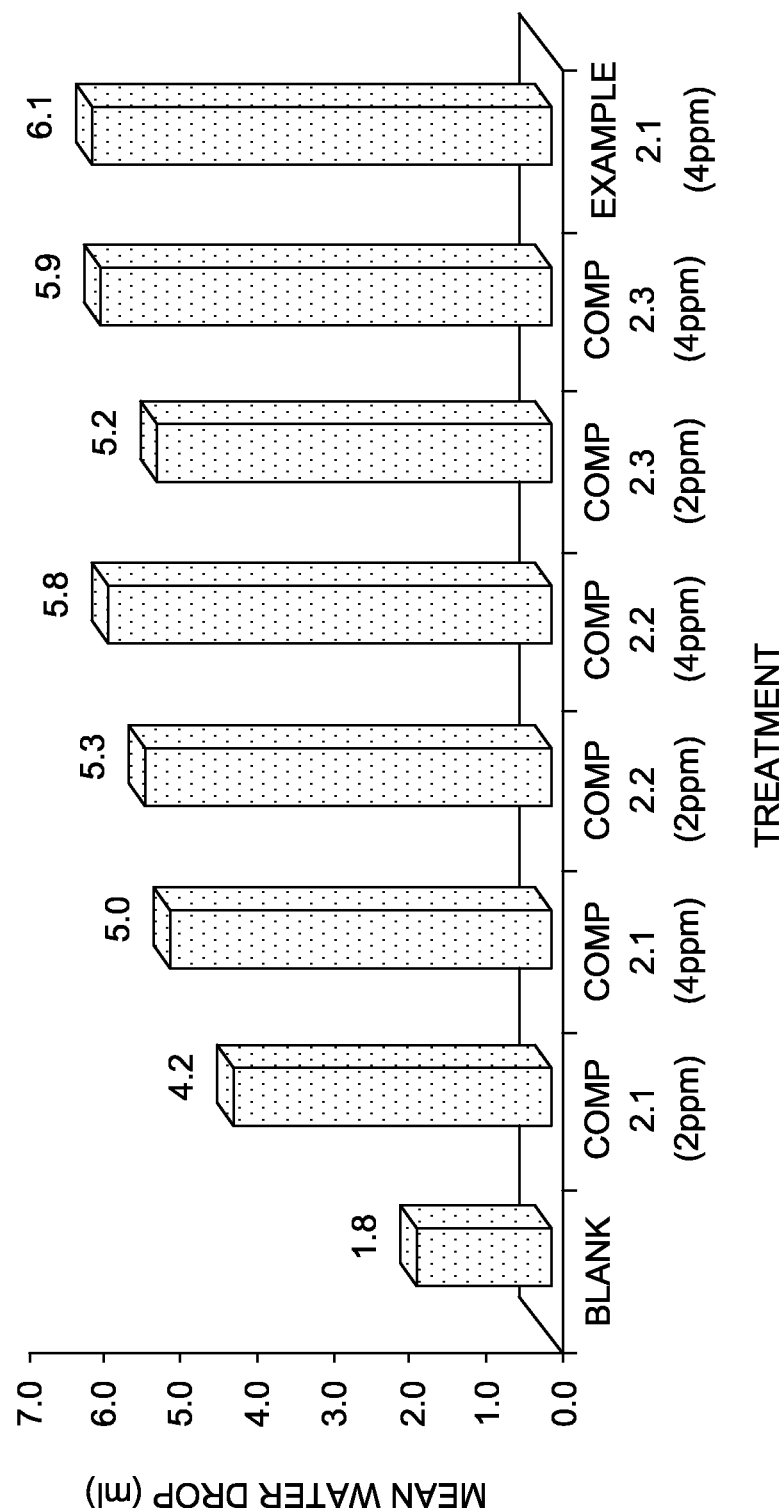
FIG. 1 depicts a bar graph showing mean water drop test results for Comparative Formulations and Example Formulation 2.1.

It was surprisingly discovered that blends of one or more $C_4$-$C_{12}$ alkyl phenol-formaldehyde resin alkoxylates produced a robust demulsifying composition that was effective at resolving emulsions in a variety of crude types. Specifically, these demulsifying compositions were more effective than current formulations in resolving emulsions in some types of heavy crudes. For example, embodiments of the demulsifying composition are particularly effective on crudes or crude blends with an American Petroleum Institute ("API") gravity ranging from about 22 to 40 (degrees). The crudes or crude blends may comprise greater than, or equal to, about 0.5 wt % asphaltenes. These crudes may also have more than about 60 pounds of filterable solids per thousand barrels; such as 20-500 lbs., or 20-200 lbs., or 60-200 lbs. Exemplary blends for which the demulsifying composition is particularly effective include blends of Canadian crude oils with American shale oils, sweet crudes, or Bakken crude. The present invention is particularly applicable to oil blends having between 1-70%, such as 20-50%, by volume of Western Canada Select crudes.

While an organic solvent may be used as part of the formulation, it was also surprisingly discovered that water may be used as a solvent for the demulsifying compositions. Water is generally less expensive than the organic solvents and alcohols frequently used in demulsifying compositions. Accordingly, novel demulsifying compositions are disclosed comprising ethoxylated surfactants in water. These demulsifying compositions are stable as the oil phase does not separate from the aqueous phase.

Without limiting this specification to any particular theory of operation, it is thought that the demulsifying compositions with water are stable because they are colloidal solutions and not true solutions as previously thought.

Colloidal solutions of surfactants contain micelles. Micelles are groups of surfactant molecules dispersed in a liquid forming a colloidal solution. Typically, micelles are spherical with the hydrophilic portion of the surfactant molecules forming the outside of the micelle and the hydrophobic portion filling the micelle's interior. Based upon factors such as concentration and temperature as well as the surfactant's chemical structure, other shapes are possible such as rods, tubes, or sheets.

The micelles only form when the concentration of the surfactant in the liquid is greater than the critical micelle concentration ("CMC"). The CMC may vary depending on the surfactant and the liquid used. Other factors that affect the CMC are temperature, pressure, and the presence of any other compounds that affect the surface tension of the liquid.

Primary emulsion breakers typically have multiple components, including, but not limited to, ethoxylated surfactants in an organic solvent, or "oil", like naphtha or toluene. An "oil" is any liquid that is soluble in another oil or organic solvent, but is not soluble in water. Thus the micelles in primary emulsion breakers are "inverse" micelles because the hydrophobic portion of the surfactant forms the outside of the micelle, and the hydrophilic portion fills the interior. It is thought that when added to primary emulsion breakers, aqueous solvents, such as water, enter into the interior of the micelles and "hydrate" the hydrophilic, or polar portion, of the ethylene oxide molecules. The organic solvents may include aromatic and/or non-aromatic organic solvents.

It was surprisingly discovered, however, that replacing some or all of the organic solvents, like naphtha or toluene, with water, resulted in stable demulsifying compositions, even though the primary emulsion breakers may comprise oil-based components. Without limiting the invention to one theory, it is thought that instead of "inverse" micelles, typical micelles are formed, where the hydrophilic portions of the surfactant molecules form the outside of the micelle and the hydrophobic portions, or non-polar regions of the surfactant molecules, fill the micelle's interior. Accordingly, demulsifying compositions and methods of use are disclosed wherein the demulsifying compositions may comprise an oil phase and an aqueous phase that form a colloidal micellar solution.

The present invention is directed to a demulsifying composition and a method of resolving an emulsion in a hydrocarbon stream with such demulsifying composition. Accordingly, in one embodiment, a method of resolving an emulsion present in a hydrocarbon stream is disclosed. The method may comprise contacting the hydrocarbon stream with a demulsifying composition to coalesce aqueous droplets from the emulsion to form an aqueous stream. The aqueous stream may then be removed.

The demulsifying composition may comprise one or more $C_4$-$C_{12}$ alkyl phenol-formaldehyde resin alkoxylates, each of which may be individually referred to herein as a "demulsifying resin" and collectively as "demulsifying resins". In one embodiment, the demulsifying composition may comprise at least one $C_4$-$C_{12}$ alkyl phenol-formaldehyde resin alkoxylate, an oil phase, and an aqueous phase, wherein the oil and aqueous phases form a colloidal micellar solution. In another embodiment, the $C_4$-$C_{12}$ alkyl phenol-formaldehyde resin alkoxylate may have a polymerization number of 2-20 and a degree of alkoxylation greater than about 30% and less than about 90% relative to the weight of the resin.

In yet another embodiment, the demulsifying composition may comprise 0.1 wt % to about 90 wt % water based on a total weight of the demulsifying composition. Alternatively, the demulsifying composition may comprise 0.1 wt % to about 30 wt % water based on a total weight of said demulsifying composition.

The demulsifying composition may comprise multiple demulsifying resins. Each demulsifying resin may be a $C_4$-$C_{12}$ alkyl phenol-formaldehyde resin alkoxylate, such as a $C_5$-$C_9$ alkyl phenol-formaldehyde resin alkoxylate, and may be present in from 1-20%, such as 3-11%, of the weight of the demulsifying composition. Each alkyl phenol formaldehyde resin alkoxylate may be present in the demulsifying composition at or above its critical micelle concentration.

Each demulsifying resin may contain 30-90% alkoxylate by weight, such as 35-85, 50-85%, 60-85%, 80-85%, 35-60%, or 50-55% alkoxylate by weight. Each demulsifying resin may have a polymerization number (i.e. the number of alkyl phenol formaldehyde units) of 2-20, 2-9, 2-8, 6-8, 8-9, or 9. The alkoxylate portion can include ethylene oxide ("EO") units, propylene oxide ("PO") units, or a mixture of EO and PO units, but EO units are preferred. The demulsifying resin is preferably nonylphenol formaldehyde resin alkoxylate and is more preferably nonylphenol formaldehyde resin ethoxylate.

In yet another embodiment, the demulsifying composition may comprise at least two different demulsifying resins. The two different demulsifying resins may differ in terms of the degree of polymerization, amount of alkoxylation, the type of alkyl phenol, etc. For example, the two alkyl phenol-formaldehyde resin alkoxylates may comprise a first alkyl phenol-formaldehyde resin alkoxylate, having a percent A by weight of alkoxylation, and a second alkyl phenol-formaldehyde resin alkoxylate, having a percent B by weight of alkoxylation, wherein A minus B is 10-50%. The ratio by weight of the first alkyl phenol-formaldehyde resin alkoxylate relative to the second alkyl phenol-formaldehyde resin alkoxylate may be 1:9 to 9:1. Thus, there may be a difference in alkoxylation where one of the demulsifying resins has an alkoxylation that is 50-85%, 60-85%, or 80-85% of the weight of the molecule, while the other demulsifying resin has an alkoxylation that is 30-60%, or 35-60%, or 50-55% of the weight of the molecule. Preferably, the difference in alkoxylation between a first demulsifying resin and a second demulsifying resin ranges from 10-50%, or any range within this range, such as 25-30%. Thus, if one resin has 85% alkoxylation, and the other one has 35% alkoxylation, then the difference is 50%. If one demulsifying resin has 60% alkoxylation and the other has 50%, then the difference is 10%. Similarly, if one has 85% alkoxylation and the other one has 55%, then the difference is 30%, and if one has 80% and the other has 55%, then the difference is 25%. By using two different demulsifying resins with a different amount of alkoxylation, as identified above, the performance of the demulsifying composition is improved, particularly with the types of crude oils mentioned above. Each of the two demulsifying resins would be used as 1-20%, or more preferably, 3-11% by weight of the demulsifying composition. The ratio of the amount of one demulsifying resin to the other may be 1:9 to 9:1, 1:3 to 3:1, and 1:1. As stated above, the preferred alkoxylation is with EO and/or PO. The two resins may be used in the demulsifying composition at or above their critical micelle concentration. At least one of the demulsifying resins may be a nonylphenol formaldehyde resin alkoxylate with a degree of polymerization of about 8-9 and about 55% ethylene oxide by weight.

The amount of the demulsifying composition used will vary with refineries and the amount of emulsification present in the hydrocarbon stream. Accordingly, in another method, the demulsifying composition may be added to the hydrocarbon stream in an amount ranging from about 1 to about 200 ppm by volume of the hydrocarbon stream. Alternatively, the demulsifying composition may be added to the hydrocarbon stream in an amount ranging from about 1 to about 100 ppm, or about 1 to about 30 ppm, or about 2 to about 25 ppm by volume of the hydrocarbon stream.

In another embodiment, the demusifying composition may further comprise at least one polyalkylene oxide polyol with a degree of ethoxylation greater than about 30% and less than about 85% and a molecular weight ranging from about 1000 to about 25,000. The ratio by weight of the $C_4$-$C_{12}$ alkyl phenol-formaldehyde resin alkoxylate to the polyalkylene oxide polyol may range from about 1:9 to about 9:1.

In yet another embodiment, at least one polyalkylene oxide polyol may comprise two polyalkylene oxide polyols, wherein at least one of the polyalkylene oxide polyols may be selected from the group consisting of ethylene oxide/propylene oxide block polymers, ethylenediamine alkoxylates, polyethylenimine alkoxylates, glycerol alkoxylates, trimethylpropane alkoxylates, and sorbitol alkoxylates.

In yet another embodiment, the first polyalkylene oxide polyol may be an ethylene oxide/propylene oxide block copolymer. The copolymer may have an ethylene oxide ("EO") and propylene oxide ("PO") ratio by weight relative to the total aggregate amount of EO and PO of about 30-50% EO and 50-70% PO, and more preferably 40-50% EO and 50-60% PO. Thus, the copolymer may be less than about 50% ethylene oxide by weight. In the copolymer, there are preferably two blocks of EO (EO1 and EO2), and one block of PO. The ratio by weight between EO1 and EO2 relative to the total aggregate amount of EO may be 30-70% EO1 and 30-70% EO2, preferably 45-55% EO1 and 45-55% EO2, and most preferably, EO1 is about the same as EO2. The copolymer may have a molecular weight of 1000-9000, preferably from 4000-5000, and usually has an average molecular weight, Mw, less than about 6,000 g/mol.

In another embodiment, the first polyalkylene oxide polyol may be an ethylene oxide/propylene oxide block copolymer having the formula:

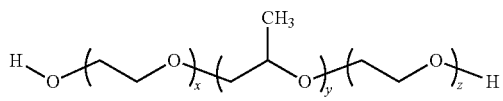

wherein x, y, and z are any integer greater than one, and the molecule has a molecular weight of 1000-9000.

The second polyalkylene oxide polyol may be a polyalkylene oxide block polymer having a molecular weight of 3000-25000 and 2-6 branches. Each branch may comprise at least one polyalkoxylate block. In yet another embodiment, the second polyalkylene oxide polyol may have 4-6 branches, most preferably four branches. The polyalkoxylate blocks may be blocks of EO units, and/or PO units, and/or butylene oxide (BO) units. The molecular weight of the second polyalkylene oxide polyol with two or more branches with polyalkoxylate blocks may be 3000-25000, or preferably 4000-10500, or more preferably 4700-7000. The second polyalkylene oxide polyol may contain at least one block of EO units and at least one block of PO units on each of its 2-6 branches. Preferably, each of these branches includes only one block of EO units and one block of PO units. Also preferably, the PO blocks are closer to the branch point than the EO blocks. The second polyalkylene oxide polyol with two or more branches may be included in the demulsifying composition in an amount of 0.5% to 10%, or preferably 1% to 4% weight relative to the total demulsifying composition.

Examples of the second polyalkylene oxide polyol with two or more branches with polyalkoxylate blocks may include block copolymers based on ethylenediamine, propylenediamine, diethylenetriamine, or triethylenetetramine. Examples of these types of copolymers are ethylenediamine ethylene oxide/propylene oxide copolymer, propylenediamine ethylene oxide/propylene oxide copolymer, diethylenetriamine ethylene oxide/propylene oxide copolymer, and triethylenetetramine ethylene oxide/propylene oxide copolymer.

One example of the second polyalkylene oxide polyol with two or more branches may have the formula:

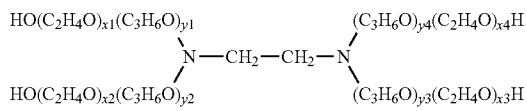

where x1, x2, x3, and x4 may be the same or different and represent the number of polyethylene oxide units and where y1, y2, y3, and y4 may be the same or different and represent the number of polypropylene oxide units, and where the molecular weight is from about 3000-25000. The ratio of the polyethylene oxide units to polypropylene oxide units may range from 10:90 to 90:10, or 50:50 to 30:70, and may be about 30:70 or about 50:50. The ethylenediamine ethylene oxide/propylene oxide copolymer may have about 40% EO by weight and an average molecular weight, Mw, of about 6,700.

In other embodiments, the demulsifying composition may further comprise one or more aqueous or oil-based crude oil treatments or additives to aid in demulsification or provide other advantages. Accordingly, the aqueous phase may comprise one or more components, including, but not limited to a pH adjuster, a water-soluble surfactant, a wetting agent, a metal complexing agent, a reverse emulsion breaker, or a corrosion inhibitor. Some of these components are described in other portions of this disclosure in more specificity. It is also anticipated that the aqueous phase of the demulsifying composition may comprise one or more water-soluble additives that aid in demulsification or provide other advantages.

In one embodiment, the aqueous phase may comprise a water-soluble pH adjusting agent. The pH adjusting agent may be a base or an acid. The pH adjusting agent may be present in an amount ranging from about 0.5 wt % to about 10 wt % of a total weight of the demulsifying composition. Alternatively, the pH adjusting agent may be present in an amount ranging from about 0.5 wt % to about 3 wt % of a total weight of the demulsifying composition. Suitable bases may be hydroxide bases of Group IA and IIA metals. In one embodiment the hydroxide base may be sodium or potassium hydroxide. In another embodiment, the pH adjuster may be an organic acid, mineral acid, or a carboxylic acid. Examples of suitable acids include, citric acid, propane-1,2,3-tricarboxylic acid, glycolic acid, formic acid, acetic acid, propanoic acid, butanoic acid, pentanoic acid, oxalic acid, glutaric acid, succinic acid, malonic acid, ascorbic acid, and lactic acid. Citric acid has the added advantage in that is also a metal complexing agent and may reduce the amount of metals in the stream being treated. The pH adjusting agent, such as the hydroxide bases, may be added in effective amounts such that the demulsifying composition will result in a pH of 6-8.

The corrosion inhibitor, such as a water soluble corrosion inhibitor, may comprise at least one member selected from the group consisting of amidoethyl imidazoline, hydroxyethyl imidazoline, and aminoethyl imidazoline. The corrosion inhibitor may be present at about 0.5 wt % to about 10 wt % based on a total weight of the demulsifying composition. Alternatively, the corrosion inhibitor may be present at about 0.5 wt % to about 5 wt % based on a total weight of the demulsifying composition.

In another embodiment, the aqueous phase may comprise one or more wetting agents like sulfonates and their acids. Suitable sulfonates include, but are not limited to, sodium dioctyl sulfosuccinate and sodium dodecylbenzene sulfonate and acids thereof. In another embodiment, the demulsifying composition may further comprise, by weight, 0.5-20%, or preferably, 1-10% of a wetting agent, such as dodecylbenzene sulfonic acid.

Reverse emulsion breakers are materials that aid in flocculation or coalescence of crude-oil in water emulsions. As such, reverse emulsion breakers may be categorized as flocculants or coagulants. The reverse emulsion breaker may include one or more inorganic coagulants, such as hydrated chlorides and sulfates. Suitable hydrated chlorides include, but are not limited to, aluminum chloride, aluminum chlorohydrate, iron chloride, and zinc chloride. Suitable sulfates include, but are not limited to, aluminum sulfate, and iron sulfate. These coagulants can be used by themselves or in combination with other coagulants and/or with flocculants. For example, the reverse emulsion breaker may comprise aluminum chlorohydrate and polydiallyldialkylammonium chloride such as poly(diallyldimethylammonium chloride). The poly(diallyldialkylammonium chloride) may have a molecular weight of about 20,000 to about 500,000, such as about 100,000. The weight ratio of aluminum chlorohydrate to poly(diallyldimethylammonium chloride) may be about 1:10 to about 100:1, or about 3:1 to 15:1, or about 9:1. Other cationic polymers can be used in conjunction with the aluminum chlorohydrate.

Cationic polymers can also be used as coagulants and flocculants. Cationic polymeric coagulants typically have a molecular weight that is less than 1 million, such as 20,000 to 500,000 or 30,000 to 300,000. Cationic polymeric flocculants typically have a molecular weight which up to 15 million, such as 2-15 million, or 5-15 million, or 2-12 million, or 3-9 million.

Cationic polymeric coagulants include several categories, including quaternized starches, melamine formaldehyde polymers, tannin-based polymers, dialkyldiallylammonium polymers, and polyamines, and they have the molecular weights mentioned above. Tannins can be used by themselves or they can be combined with other structures, resulting in, for example, acryloyloxyethyl trimethyl ammonium chloride/tannin polymers. Dialkyldiallylammonium polymers can include but are not limited to, polydiallyldimethylammonium chloride, polydiethyldiallyl ammonium chloride, polydimethyl diallyl ammonium bromide, and polydi-ethyl diallyl ammonium bromide.

The polyamines can be one or a combination of molecules exemplified by the formula below:

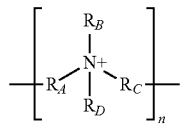

where $R_A$, $R_B$, $R_C$, and $R_D$ may be, independently, the same or different and are H, or alkyls of 1 to 20 carbon atoms, preferably 1-8 carbon atoms. N ranges from 100 to 50,000. The alkyls may be straight alkyls, branched alkyls, substituted alkyls (such as hydroxyl-substituted alkyls or alkoxy-substituted alkyls), or aryls. Suitable amine monomers include, but are not limited to, dimethylamine and dimethylpropylamine.

Other amines that can be polymerized to form suitable cationic polymers are: dimethylaminopropylamine, 1,4-dimethylpiperazine, N-methylpyrrolidine, di-ethylhydroxylamine, pyrrolidine, N,N,N,N-tetramethylethylenediamine, diethylenetriamine and furfurylamine.

Cationic polymeric flocculants have the molecular weights mentioned above, and are usually acrylamide polymers. Examples are polymers of acrylamide with diallyldimethylammonium chloride or acryloyloxyethyltrimethylammonium chloride or methacryloyloxyethyl trimethyl ammonium chloride or methacryloyloxyethyl trimethyl ammonium methyl sulfate or acrylamido propyl trimethyl ammonium chloride or 3-(methacrylamido) propyl trimethyl ammonium chloride or methacrylamidopropyltrimethylammonium chloride. However, polymers of the following can also be utilized as cationic polymeric flocculants without the acrylamide: acryloyloxyethyltrimethylammonium chloride or methacryloyloxyethyl trimethyl ammonium chloride or methacryloyloxyethyl trimethyl ammonium methyl sulfate or acrylamido propyl trimethyl ammonium chloride or 3-(methacrylamido) propyl trimethyl ammonium chloride or methacrylamidopropyltrimethylammonium chloride.

Generally, the reverse emulsion breakers can include coagulants and/or flocculants, and may include one or more coagulants and/or one or more flocculants. The reverse emulsion breaker may be present at about 0.5 wt % to about 10 wt % based on a total weight of the demulsifying composition. Alternatively, the reverse emulsion breaker may be present at about 0.5 wt % to about 5 wt % based on a total weight of the demulsifying composition.

In another embodiment, the demulsifying composition may comprise at least one member selected from the group consisting of an acid, a non-polar organic solvent, a base, a wetting agent, and a dispersant. Suitable acids include, but are not limited to, acetic acid, citric acid, malic acid, maleic acid, succinic acid, glycolic acid, methane sulfonic acid, dodecylbenzenesulfonic acid, naphthalene sulfonic acid, and p-toluene sulfonic acid. Suitable non-polar organic solvents include, but are not limited to, naphtha, light aromatic naphtha, heavy aromatic naphtha, pentane, cyclopentane, hexane, cyclohexane, benzene, ethyl benzene, 1,2,4-trimethyl benzene, 1,3,5-trimethyl benzene, toluene, xylene, cumene, 1,4-dioxane, chloroform, diethyl ether, methyl esters of fatty acids (biodiesel), and diethylene glycol butyl ether. Suitable bases include, but are not limited to, sodium hydroxide and potassium hydroxide. Suitable wetting agents include, but are not limited to sodium dioctyl sulfosuccinic acid and sodium dodecylbenzene sulfonic acid. Suitable dispersants include adducts of at least one mono- or poly-carboxylic acid or anhydride and an acylating reagent. Suitable acylating reagents include, but are not limited to, fumaric acid, maleic anhydride, maleic acid, succinic anhydride, and succinic acid. The acid and/or base can be used to adjust pH.

In yet another embodiment, the $C_4$-$C_{12}$ alkyl phenol-formaldehyde resin alkoxylate may comprise at least one member selected from the group consisting of: a) a mixed resin with units of nonylphenol formaldehyde alkoxylate and units of butylphenol formaldehyde alkoxylate; b) a resin with units of nonylphenol formaldehyde alkoxylate; and c) a resin with units of amylphenol formaldehyde alkoxylate.

In yet another embodiment, the demulsifying resin may comprise an adduct of at least one $C_4$-$C_{12}$ alkyl phenol-formaldehyde resin alkoxylate and the nonylphenol formaldehyde resin alkoxylate that is at least 50% ethylene oxide by weight. For example, the demulsifying resin may be an adduct of monomers of a nonylphenol formaldehyde resin alkoxylate that is at least 50% ethylene oxide by weight, such as 50-90% ethylene oxide, or 70-90% ethylene oxide, and monomers of a butylphenol formaldehyde resin alkoxylate that is at least 50% ethylene oxide by weight, such as 50-90% ethylene oxide, or 70-90% ethylene oxide by weight. The total degree of polymerization for both monomers may be 3-10 or 6-9. The ratio of the number of monomers containing butylphenol versus nonylphenol in the final resin may be 9:1 to 1:9, or preferably 2:1 to 1:2. This particular resin is appropriate for crudes having an API of 28-40. The amount of this resin that can be used is 1-20%, preferably 3-11% by weight relative to the demulsifying composition. This resin may be used by itself or in conjunction with another demulsifying resin described in the present application. Accordingly, the demulsifying resin may comprise two different resins, each resin with different alkyl phenol units. For example, the demulsifying resin may comprise a nonylphenol formaldehyde resin alkoxylate and an amyphenol formaldehyde resin alkoxylate. Alternatively, the demulsifying resin may comprise different alkyl phenol units, such as nonylphenol and butylphenol, within one resin.

In another embodiment, at least one $C_4$-$C_{12}$ alkyl phenol-formaldehyde resin alkoxylate may be a nonylphenol formaldehyde resin alkoxylate that is at least 50% ethylene oxide by weight. In another embodiment, at least one $C_4$-$C_{12}$ alkyl phenol-formaldehyde resin alkoxylate may be a nonylphenol formaldehyde resin alkoxylate with a degree of polymerization of about 8-9 and is about 55% ethylene oxide by weight. In another embodiment, the $C_4$-$C_{12}$ alkyl phenol-formaldehyde resin alkoxylate may be amyl phenol-formaldehyde resin alkoxylate.

In another method, the hydrocarbon stream may comprise crude oil. In yet another method the emulsion may be resolved in a desalter of a crude oil refinery. The demulsifying composition may be added to the desalter or upstream of the desalter (i.e., to the crude oil before it enters the desalter). In another embodiment, the demulsifying composition may be added right before the mixing valve upstream of the desalter. It is also possible to add the demulsifying composition to the wash water of the desalter, particularly if the demulsifying composition contains water.

In yet another method, the oil phase may comprise at least one non-polar organic solvent. Suitable non-polar organic solvents include, but are not limited to, naphtha, light aromatic naphtha, heavy aromatic naphtha, pentane, cyclopentane, hexane, cyclohexane, benzene, ethyl benzene, 1,2,4-trimethyl benzene, toluene, xylene, cumene, 1,4-dioxane, chloroform, diethyl ether, methyl esters of fatty acids (biodiesel), and diethylene glycol butyl ether (butyl carbitol).

In another method, the demulsifying composition may comprise an aqueous solvent. The aggregate amount of solvent, whether organic or aqueous, may be about 10% to 90%, such as 40-90% or 10-75%, or 50-85%, and is preferably 55-75% by weight of the demulsifying composition. The oil phase and the aqueous phase in the demulsifying composition may form a colloidal micellar solution. Any ratio of organic solvent to aqueous solvent is within the scope of the present invention, with the extremes being 100% aqueous solvent or 100% organic solvent relative to the amount of solvent. Preferably, the ratio of aqueous solvent to organic solvent is 90:10 to 70:30.

In another method embodiment, the demulsifying composition may further comprise a coupling agent or stabilizer, to further stabilize the demulsifying composition and prevent the phase separation. Suitable stabilizers include, but are not limited to, diethylene glycol butyl ether, hexylene glycol, methyl cellosolve (2-methoxyethanol), butanol, and octanol. The coupling agent or stabilizer may be present in an amount of 5-50%, such as 5-25%, and such as 5-20% of the demulsifying composition. The coupling agent may be an organic solvent, an example being diethylene glycol butyl ether (i.e. butyl carbitol). Accordingly, in another embodiment, the demulsifying composition may further comprise diethylene glycol butyl ether.

In another embodiment, a dispersant, such as an alkyl succinic anhydride based material, may be used in conjunction with the demulsifying composition to improve performance. The alkyl succinic anhydride based material may be a polyisobutenyl succinic anhydride based material. While a polyisobutenyl succinic anhydride-based material may have been used as an antifoulant for crude oil, such as in upstream applications, this material has special properties that will work conjunctively with the demulsifying composition to better resolve emulsions in downstream applications. Asphaltenes in the crude oil are believed to have hydrophilic functionalities which may result in a colloidal aggregation or flocculation of the asphaltenes at the interface of the aqueous phase and oil phase in a desalter. These hydrophilic functionalities decrease the ability of the dispersed phases to migrate towards respective continuous phases to resolve the emulsion. Thus, asphaltenes make resolving emulsions in a desalter difficult. The polyisobutenyl succinic anhydride based material is believed to adsorb onto the asphaltenes and decrease the colloidal aggregation or flocculation and deposition of the asphaltenes at the oil-water interface, thereby accelerating the speed at which the emulsion may be resolved by the demulsifying composition. The polyisobutenyl succinic anhydride based material may be added together with the demulsifying composition or separately, such as upstream of the addition of the demulsifying composition. The advantage of the separate addition is that the addition may be selective for crudes which have an asphaltene content of 0.5% or more, such as 0.5% to 50%, or 0.5% to 10%, or 0.5% to 8%.

The dispersant may be an ester that is a mono- or polycarboxylic acid or anhydride that has been treated with an acylating reagent. The mono- or polycarboxylic acid ester may have at least one moiety that is a polyol as shown in any of the following three formulas:

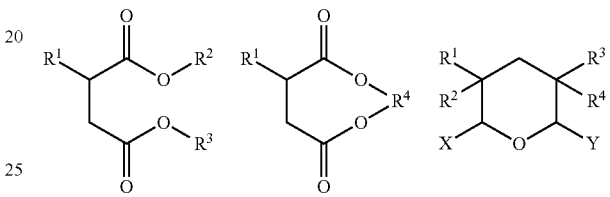

where $R^1$, $R^2$, $R^3$, and $R^4$ are the same or different and are selected from the group consisting of H, an alkyl, and $CH(OH)(R^5)$; wherein $R^5$ is H or $C_1$ to $C_{10}$ alkyl; and wherein X and Y are the same or different and are H or $C_1$ to $C_{10}$ alkyl, with the proviso that at least one of $R^2$, $R^3$, and $R^4$ is the $CH(OH)(R^5)$ moiety. Suitable alkyls may be polyalkenes, including interpolymers of various alkenes, and may include, but are not limited to, ethylene, propene, isoprene, 1-butene, 2-butene, isobutene, 3-pentene, 1-hexene, 1-octene, 4-octene, 2-methyl-1-heptene, 3-cyclohexyl-1-butene, 2-methyl-5-propyl-1-hexene, styrene, butadiene, and piperylene. The —$CH(OH)(R^5)$ moiety may be mono or polyhydric alcohols, preferably polyhydric, such as glycerol, erythritol, pentaerythritol, mannitol, and sorbitol.

The acylating reagent may be aliphatic mono- or polycarbocylic acids, anhydrides, or halides. Suitable acylating reagents may include, but are not limited to, fumaric acid, maleic anhydride, maleic acid, succinic anhydride, and succinic acid.

In a preferred embodiment, the acid ester has a polyisobutenyl and pentaerythritol moiety and has been treated with succinic anhydride or succinic acid such that the dispersant is a polyisobutenyl succinic anhydride ester ("PiBS ester") with a polyol moiety as in the following formula:

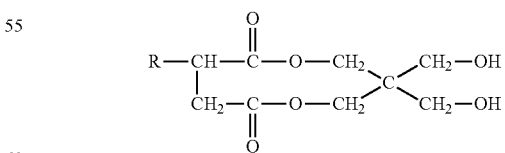

wherein R is a polyisobutenyl moiety.

Accordingly, in another embodiment, an alkyl succinic anhydride based material, such as a polyisobutenyl succinic anhydride based material may be used as the dispersant. The dispersant, such as the polyisobutylenyl succinic anhydride based material may be added to the desalter or upstream of the desalter in an amount of 1-1000 ppm, or 2-200 ppm, or more preferably, 20-200 ppm by volume of the hydrocarbon stream.

The polyisobutenyl succinic anhydride based material may be a polyisobutenyl succinic anhydride derived ester with a molecular weight, Mw, of about 20,000 to about 25,000 in an aromatic solvent. The % actives may range from about 10-50% and the solvent may be aromatic naphtha.

In another embodiment, a demulsifying composition for treating a hydrocarbon stream is provided. The demulsifying composition may comprise at least one $C_4$-$C_{12}$ alkyl phenol-formaldehyde resin alkoxylate, an oil phase, and an aqueous phase, wherein the oil and aqueous phases form a colloidal micellar solution. The demulsifying composition may comprise 0.1 wt % to about 90 wt % water based on a total weight of said demulsifying composition.

In another embodiment, the $C_4$-$C_{12}$ alkyl phenol-formaldehyde resin alkoxylate may have a polymerization number of 2-20 and a degree of alkoxylation greater than about 30% and less than about 90% relative to the weight of the resin. In yet another embodiment, the demulsifying composition comprises 0.1 wt % to about 30 wt % water based on a total weight of said demulsifying composition.

In another embodiment, the $C_4$-$C_{12}$ alkyl phenol-formaldehyde resin alkoxylate comprises at least two alkyl phenol-formaldehyde resin alkoxylates having different amounts of alkoxylation. The two alkyl phenol-formaldehyde resin alkoxylates may comprise a first alkyl phenol-formaldehyde resin alkoxylate, having a percent A by weight of alkoxylation, and a second alkyl phenol-formaldehyde resin alkoxylate, having a percent B by weight of alkoxylation, wherein A minus B is 10-50%. The ratio by weight of an amount of the first alkyl phenol-formaldehyde resin alkoxylate relative to the second alkyl phenol-formaldehyde resin alkoxylate may be 1:9 to 9:1.

In yet another embodiment, the demulsifying composition may further comprise at least one polyalkylene oxide polyol with a degree of ethoxylation greater than about 30% and less than about 85% and a molecular weight ranging from about 1000 to about 25,000. The ratio by weight of the $C_4$-$C_{12}$ alkyl phenol-formaldehyde resin alkoxylate to the polyalkylene oxide polyol may range from about 1:9 to about 9:1. In another embodiment, the polyalkylene oxide polyol may comprise two polyalkylene oxide polyols, wherein one of the polyalkylene oxide polyols may be selected from the group consisting of ethylene oxide/propylene oxide block polymers, ethylenediamine alkoxylates, polyethylenimine alkoxylates, glycerol alkoxylates, trimethylpropane alkoxylates, and sorbitol alkoxylates.

In yet another embodiment, the first polyalkylene oxide polyol may be an ethylene oxide/propylene oxide block copolymer having the formula:

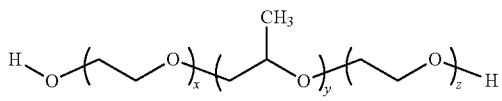

wherein x, y, and z are any integer greater than one, and the molecule has a molecular weight of 1000-9000. The second polyalkylene oxide polyol may be an oxide block copolymer having a molecular weight of 3000-25000 and 2-6 branches. Each branch may comprise at least one polyalkoxylate block.

In another embodiment, the aqueous phase may further comprise a water-soluble reverse emulsion breaker and/or a water-soluble corrosion inhibitor, as described above.

In another embodiment, the demulsifying composition may further comprise at least one member selected from the group consisting of an acid, a non-polar organic solvent, a base, a wetting agent, and a dispersant. Suitable acids include, but are not limited to, acetic acid, citric acid, malic acid, maleic acid, succinic acid, glycolic acid, methane sulfonic acid, dodecylbenzenesulfonic acid, naphthalene sulfonic acid, and p-toluene sulfonic acid. Suitable non-polar organic solvents include, but are not limited to, naphtha, light aromatic naphtha, heavy aromatic naphtha, pentane, cyclopentane, hexane, cyclohexane, benzene, ethyl benzene, 1,2,4-trimethyl benzene, 1,3,5-trimethyl benzene, toluene, xylene, cumene, 1,4-dioxane, chloroform, diethyl ether, methyl esters of fatty acids (biodiesel), and diethylene glycol butyl ether. Suitable bases include, but are not limited to, sodium hydroxide and potassium hydroxide. Suitable wetting agents include, but are not limited to, sodium dioctyl sulfosuccinic acid and sodium dodecylbenzene sulfonic acid. Suitable dispersants include adducts of at least one mono- or polycarboxylic acid or anhydride and an acylating reagent. Suitable acylating reagents include, but are not limited to, fumaric acid, maleic anhydride, maleic acid, succinic anhydride, and succinic acid.

In another embodiment, the $C_4$-$C_{12}$ alkyl phenol-formaldehyde resin alkoxylate may comprise at least one member selected from the group consisting of: a) a mixed resin with units of nonylphenol formaldehyde alkoxylate and units of butylphenol formaldehyde alkoxylate; b) a resin with units of nonylphenol formaldehyde alkoxylate; and c) a resin with units of amylphenol formaldehyde alkoxylate.

In another embodiment, a method of resolving an emulsion present in a hydrocarbon stream is disclosed. The method may comprise contacting the hydrocarbon stream with a demulsifying composition. The demulsifying composition may comprise at least one $C_4$-$C_{12}$ alkyl phenol-formaldehyde resin alkoxylate, wherein the $C_4$-$C_{12}$ alkyl phenol-formaldehyde resin alkoxylate has a polymerization number of 2-20 and a degree of alkoxylation greater than about 30% and less than about 90% relative to the weight of the resin.

In yet another method embodiment, the demulsifying composition may be added to the hydrocarbon stream in an amount ranging from about 1 to about 200 ppm by volume of the hydrocarbon stream.

In another method embodiment, the hydrocarbon stream may comprise crude oil.

EXAMPLES

Example Set 1—Stability Tests

For Example Set 1, exemplary demulsifying compositions, Examples 1.1-1.5 were prepared and the stability of the colloidal solutions was tested. For Examples 1.1-1.5, 10 wt % of an aqueous phase and 90 wt % of an oil phase were mixed to form a colloidal solution. Table 1 lists an exemplary formulation for the oil phase. The weight percents listed in Table 1 are based on the total weight of the oil phase. The various aqueous phases for the examples comprised 10 wt % of the total weight of the dual phase composition and are listed in Table 2.

TABLE 1

| Oil Phase (90 wt % of total) |
| --- |
| 22.22 wt % amylphenol formaldehyde resin alkoxylate |
| 13.33 wt % oil-soluble EtO/PrO polymer |
| 53.33 wt % naphtha and heavy aromatic solvent blend |
| 11.11 wt % hexylene glycol |

The oil phase was then combined with the aqueous phase to form a dual phase composition. The aqueous phases were aqueous solutions formulated as in Table 2.

TABLE 2

| Example | Various Aqueous Phases (10 wt % of total) |
| --- | --- |
| 1.1 | 1 wt % NaOH in solution |
| 1.2 | 10 wt % water-soluble EtO/PrO polymer |
| 1.3 | 10 wt % citric acid in solution |
| 1.4 | 10 wt % sodium dioctyl sulfosuccinate |
| 1.5 | 47 wt % aluminum chlorohydrate and poly(diallyldimethylammonium chloride) mixture |

As listed in Tables 1 and 2, an exemplary dual phase composition, Example 1.1, comprised 20 wt % amylphenol formaldehyde resin alkoxylate, 12 wt % of an oil-soluble ethylene oxide/propylene oxide polymer, 48 wt % of a non-polar organic solvent, 10 wt % hexylene glycol, and 0.1 wt % NaOH in solution. These wt % values are based on a total wt % of the dual composition. Exemplary dual phase composition Example 1.2 comprised 20 wt % amylphenol formaldehyde resin alkoxylate, 12 wt % of an oil-soluble ethylene oxide/propylene oxide polymer, 48 wt % of a non-polar organic solvent, 10 wt % hexylene glycol, and 1 wt % of a water-soluble ethylene oxide/propylene oxide polymer. Example 1.3 comprised 20 wt % amylphenol formaldehyde resin alkoxylate, 12 wt % of an oil-soluble ethylene oxide/propylene oxide polymer, 48 wt % of a non-polar organic solvent, 10 wt % hexylene glycol, and 1 wt % of a citric acid in solution. Example 1.4 comprised 20 wt % amylphenol formaldehyde resin alkoxylate, 12 wt % of an oil-soluble ethylene oxide/propylene oxide polymer, 48 wt % of a non-polar organic solvent, 10 wt % hexylene glycol, and 1 wt % sodium dioctyl sulfosuccinate. Example 1.5 comprised 20 wt % amylphenol formaldehyde resin alkoxylate, 12 wt % of an oil-soluble ethylene oxide/propylene oxide polymer, 48 wt % of a non-polar organic solvent, 10 wt % hexylene glycol, and 4.7 wt % aluminum chlorohydrate and poly(diallyldimethylammonium chloride) mixture.

The resulting dual phase compositions, Examples 1.1 through 1.5, were stable, homogenous mixtures and did not separate when stored at ambient temperature or at −10° C. for more than 14 days.

Example Set 2—Demulsifying Effectiveness

For the examples in Example Set 2, a desalter process with an electric field and desalter mix valve was simulated to evaluate the effect various emulsion breaker (demulsifier) formulations had on resolving water and crude oil emulsions. For these examples, 93 vol % crude oil was mixed with 7 vol % wash water in a test tube. Then 2 to 4 ppm by volume of a demulsifier was added to the crude oil and wash water mixture and mixed at 16,000 rpm in a blender for 3 seconds. For the sedimentation step, the mixture was allowed to settle at a temperature ranging from 115 to 130° C. and at an electrical field strength of 10 kV for residence times of 3, 6, 8, 16, and 32 minutes. A mean water drop test was performed by taking the readings of the volume of water (mL) which had dropped to the bottom of the test tube at each of the residence times and averaging the readings. The mean water drop test indicates both the speed of water drop and the amount of water that had separated from the emulsion. The mean water drop test was repeated with crude oils of various American Petroleum Institute ("API") gravities and wash waters of various pHs.

Various comparative formulations and exemplary formulations of emulsifiers were tested. The exemplary formulations were synergistic blend compositions comprising 20-60 wt % (based on a total weight of the composition) of a $C_4$-$C_{12}$ alkyl phenol-formaldehyde resin alkoxylate with a degree of ethoxylation greater than about 60% and less than about 90%; 2-20 wt % of a polyalkylene oxide polyol with a degree of ethoxtylation greater than about 30% and less than about 85%; and 1-10 wt % of an organic acid.

More specifically, the synergistic blend compositions comprised a nonylphenol-formaldehyde resin ethoxylate, with an average molecular weight of about 6,000 to 8,000 and a degree of ethoxylation of about 85% to 90% and; a nonylphenol-formaldehyde resin ethoxylate, with an average molecular weight of about 800 to about 1,500 with a degree of ethoxylation of about 70% to 80%; a polyalkylene oxide polyol, with a degree of ethoxylation of about 80% and an average molecular weight of about 8,400; a polyalkylene oxide polyol, with a degree of ethoxylation of about 40% and an average molecular weight of about 4,200; and at least one organic acid.

Comparative Formulation 2.1 ("Comp 2.1")

For Comp 2.1, a mixture of a $C_4$-$C_{12}$ alkyl phenol-formaldehyde resin alkoxylate, with a degree of ethoxylation of about 50%, and an ethylene oxide/propylene oxide block copolymer, with a degree of ethoxylation of about 40%, was used as the demulsifier.

Comparative Formulation 2.2 ("Comp 2.2")

For Comp 2.2, a nonylphenol-formaldehyde resin ethoxylate, with a degree of ethoxylation of about 85% to 90% and an average molecular weight of about 6,000 to about 8,000, was used as the demulsifier.

Comparative Formulation 2.3 ("Comp 2.3")

For Comp 2.3, a nonylphenol-formaldehyde resin ethoxylate, with a degree of ethoxylation of about 70% to 80%, and an average molecular weight of about 800 to about 1,500, was used as the demulsifier.

Example Formulation 2.1 ("Example 2.1")

For Example 2.1, the synergistic blend composition listed in Table 3 was used.

TABLE 3

| Example 2.1 | wt % |
| --- | --- |
| nonylphenol-formaldehyde resin ethoxylate (85%-90% EO) | 10 |
| nonylphenol-formaldehyde resin ethoxylate (70%-80% EO) | 10 |
| EO/PO block copolymer (40% EO) | 5 |
| EO/PO block copolymer (80% EO) | 5 |
| dodecylbenzenesulfonic acid | 1 |
| Water | 69 |

FIG. 1 shows mean water drop test results for the Comparative Formulations and Example Formulation 2.1. No demulsifier was added to the "Blank" sample. The crude oil used had an API ~27. The wash water had a pH of 7.2. The test temperature was 130° C.

Figure 2:
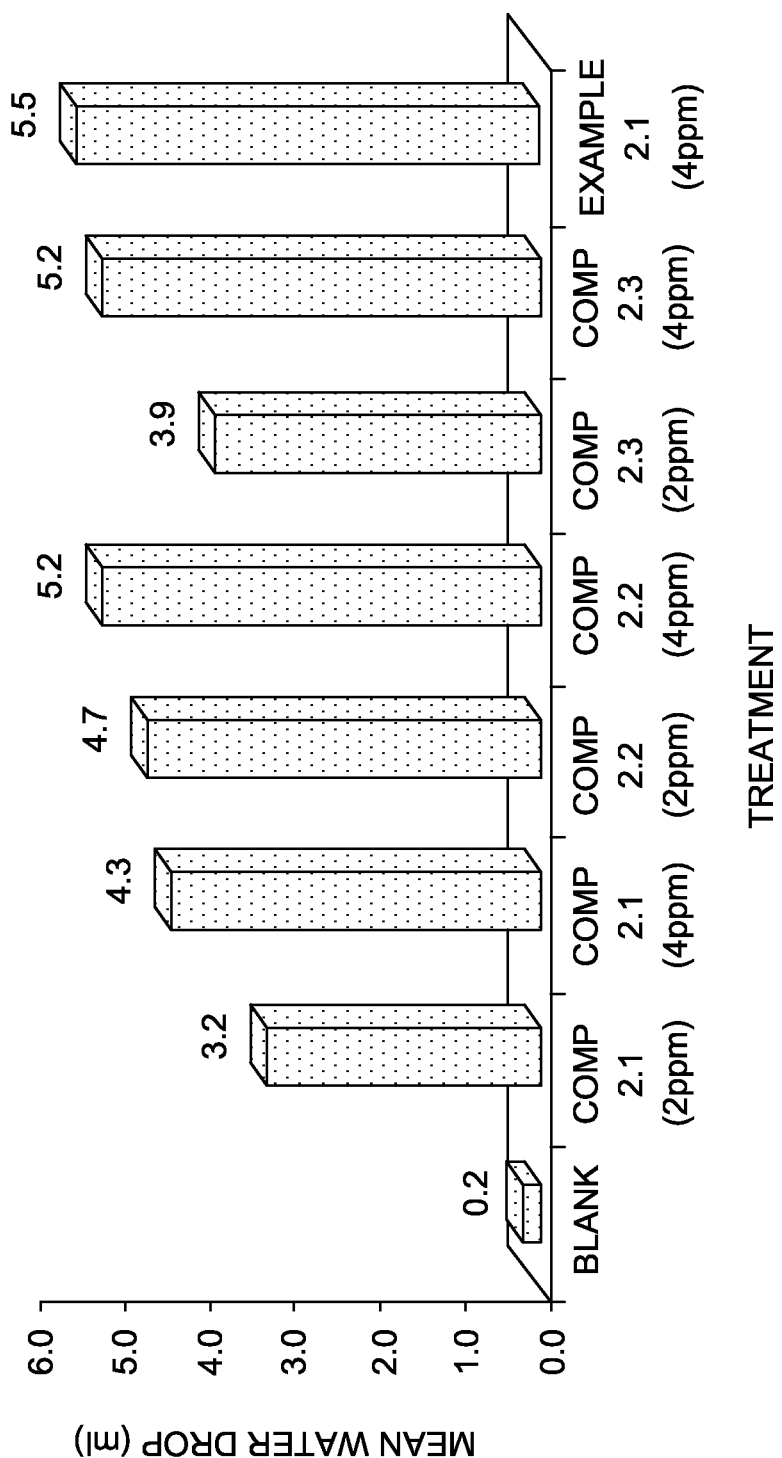
FIG. 2 depicts a bar graph showing mean water drop test results for Comparative Formulations and Example Formulation 2.1.

FIG. 2 shows mean water drop test results for the Comparative Formulations and Example Formulation 2.1. No demulsifier was added to the "Blank" sample. The crude oil used had an API ~27. The pH of the wash water was adjusted to a pH of 9.4 with a solution comprising 10 wt % NaOH and 25 wt % ammonia. The test temperature was 130° C.

Additional synergistic blend compositions, Examples 2.1A, Example 2.1B, and Example 2.1C were also tested. Their compositions are listed in Tables 4-6.

TABLE 4

| Example 2.1A | wt % |
| --- | --- |
| nonylphenol-formaldehyde resin ethoxylate (85%-90% EO) | 10 |
| nonylphenol-formaldehyde resin ethoxylate (70%-80% EO) | 10 |
| EO/PO block copolymer (40% EO) | 5 |
| EO/PO block copolymer (80% EO) | 5 |
| dodecylbenzenesulfonic acid | 1 |
| citric acid | 2 |
| Water | 67 |

TABLE 5

| Example 2.1B | wt % |
| --- | --- |
| nonylphenol-formaldehyde resin ethoxylate (85%-90% EO) | 13.5 |
| nonylphenol-formaldehyde resin ethoxylate (70%-80% EO) | 6.5 |
| EO/PO block copolymer (40% EO) | 7 |
| EO/PO block copolymer (80% EO) | 3 |
| dodecylbenzenesulfonic acid | 1 |
| citric acid | 2 |
| Water | 67 |

TABLE 6

| Example 2.1C | wt % |
| --- | --- |
| nonylphenol-formaldehyde resin ethoxylate (85%-90% EO) | 15 |
| nonylphenol-formaldehyde resin ethoxylate (70%-80% EO) | 5 |
| EO/PO block copolymer (40% EO) | 7 |
| EO/PO block copolymer (80% EO) | 3 |
| dodecylbenzenesulfonic acid | 1 |
| citric acid | 2 |
| Water | 67 |

Figure 3:
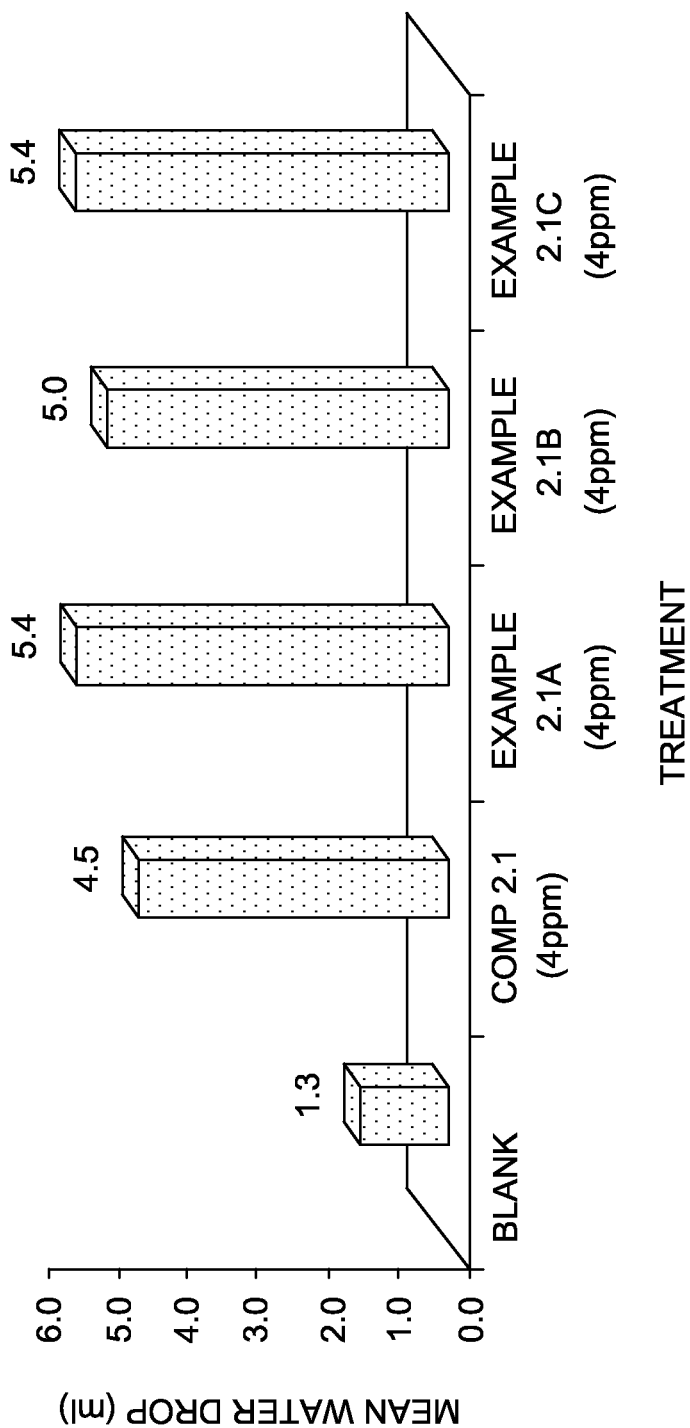
FIG. 3 depicts a bar graph showing mean water drop test results for Comparative Formulation 2.1 and Example Formulations 2.1A, 2.1B, and 2.1C at dosage levels of 4 ppm.

FIG. 3 shows mean water drop test results for the Comparative Formulation 2.1 and Example Formulations 2.1A, 2.1B, and 2.1C at dosage levels of 4 ppm. No demulsifier was added to the "Blank" sample. The crude oil used had an API 32. The pH of the wash water was 6.7. The test temperature was 125° C.

Figure 4:
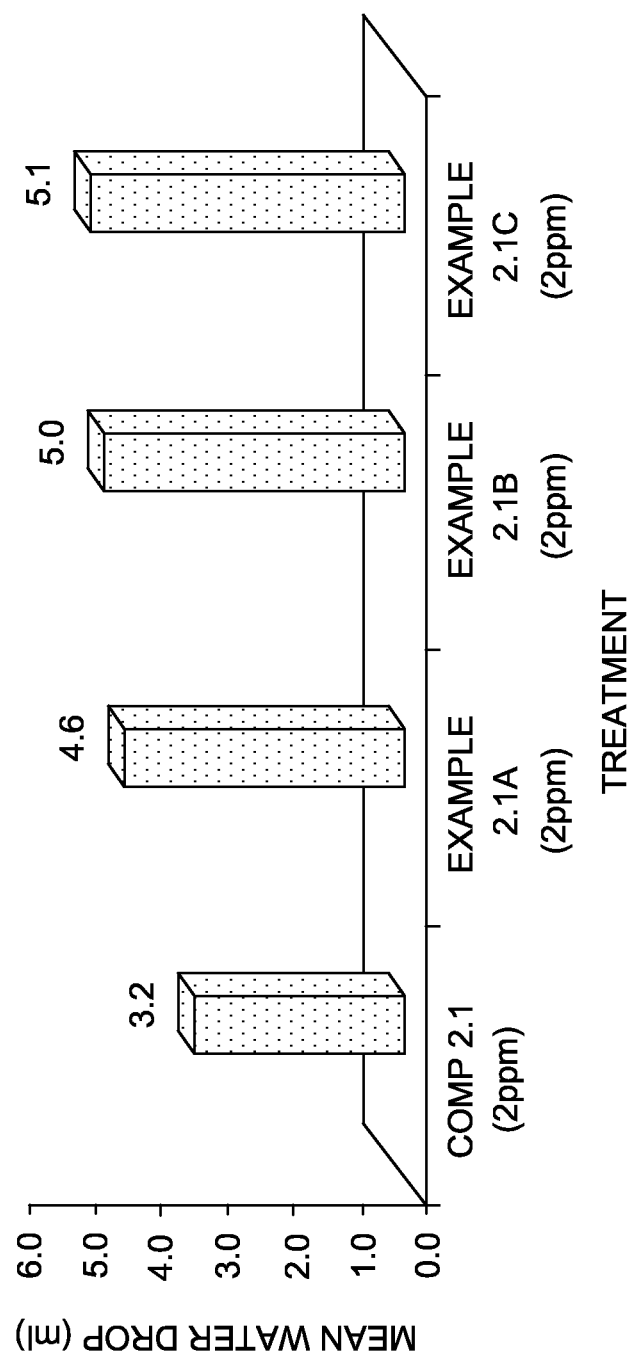
FIG. 4 depicts a bar graph showing mean water drop test results for Comparative Formulation 2.1 and Example Formulations 2.1A, 2.1B, and 2.1C at dosage levels of 2 ppm.

FIG. 4 shows mean water drop test results for the Comparative Formulation 2.1 and Example Formulations 2.1A, 2.1B, and 2.1C at dosage levels of 2 ppm. The crude oil used had an API ~32. The pH of the wash water was 6.7. The test temperature was 125° C.

Figure 5:
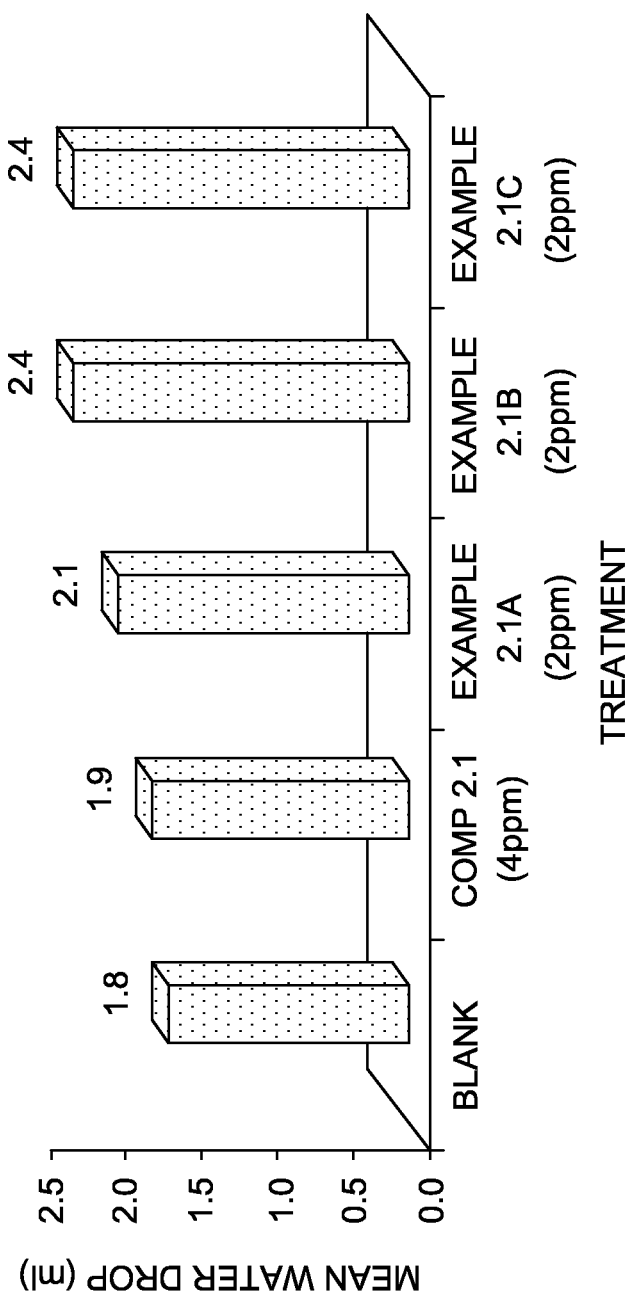
FIG. 5 depicts a bar graph showing mean water drop test results for Comparative Formulation 2.1 and Example Formulations 2.1A, 2.1B, and 2.1C at dosage levels of 2 ppm.

FIG. 5 shows mean water drop test results for the Comparative Formulation 2.1 and Example Formulations 2.1A, 2.1B, and 2.1C at dosage levels of 2 ppm. No demulsifier was added to the "Blank" sample. The crude oil used had an API 35. The pH of the wash water was 7.2. The test temperature was 115° C.

Example Set 2—Demulsifying Effectiveness at Different Temperatures

To test the demulsifying effectiveness at different temperatures, a desalter process was simulated as described above. However, the sedimentation step was repeated at 3 different temperatures, 130, 100, and 60° C. The mean water drop test was performed at all three temperatures.

Comparative Formulation 2.4 ("Comp 4")

For Comp 2.4, an EO/PO block copolymer with a degree of ethoxylation of about 80% was used as the demulsifier.

Figure 6:
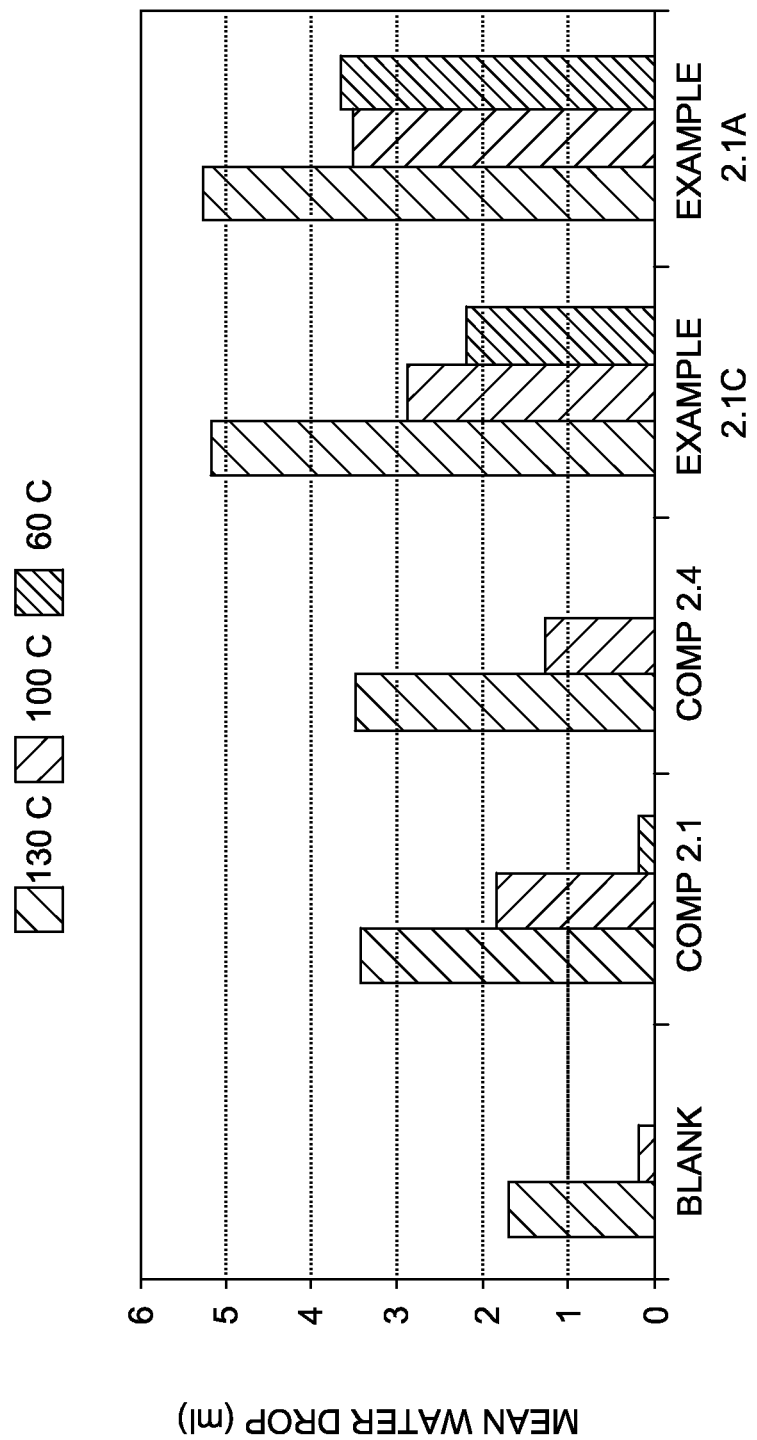
FIG. 6 depicts a bar graph showing mean water drop test results for Comparative Formulations 2.1 and 2.4 and Example Formulations 2.1A and 2.1C at dosage levels of 6 ppm.

FIG. 6 shows mean water drop test results for the Comparative Formulations 2.1 and 2.4 and Example Formulations 2.1A and 2.1C at dosage levels of 6 ppm. No demulsifier was added to the "Blank" sample.

Figure 7:
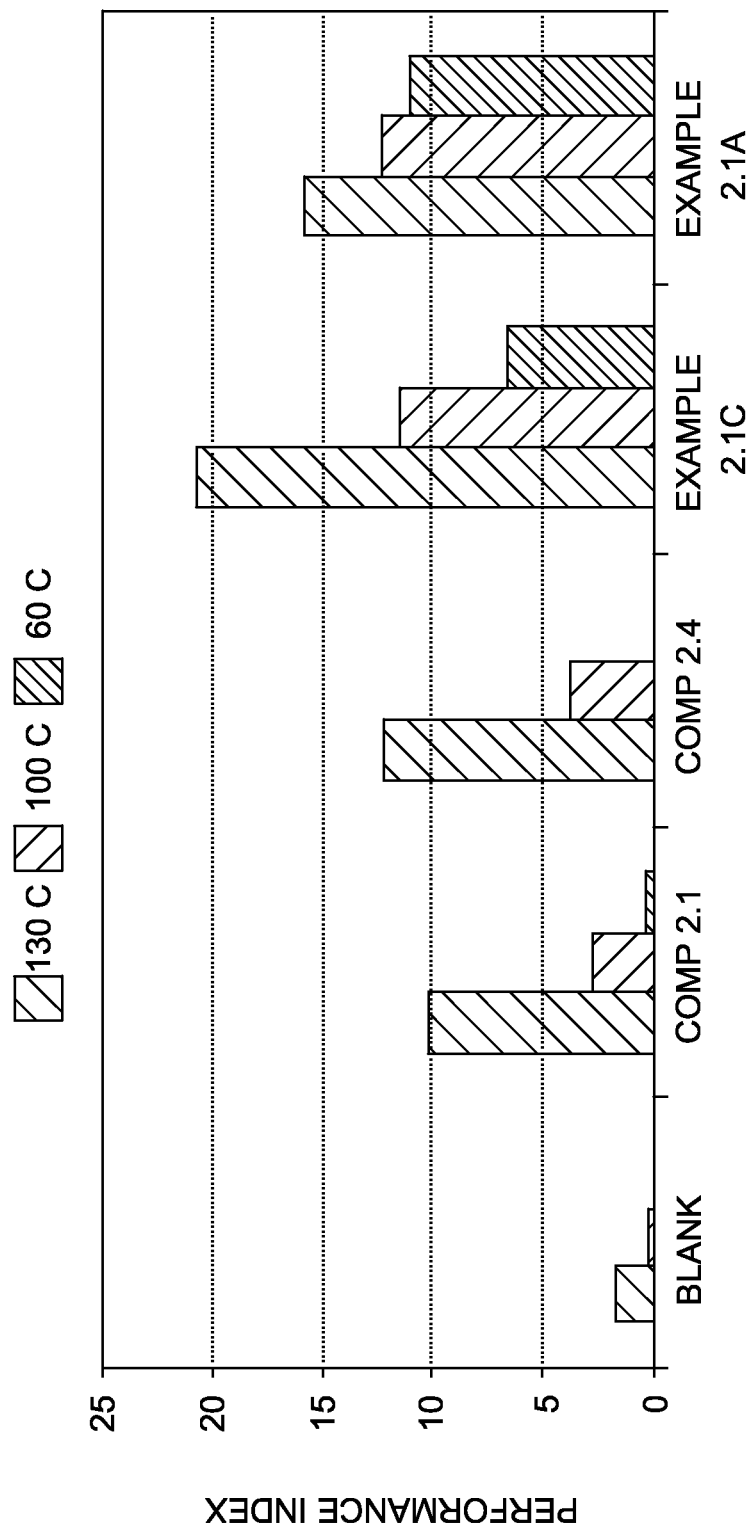
FIG. 7 depicts a bar graph showing performance index at different temperatures for Comparative Formulations 2.1 and 2.4 and Example Formulations 2.1A and 2.1C.

FIG. 7 shows the performance index at different temperatures for the emulsions tested in Example Set 2 and shown in FIG. 6. To calculate the performance index, the demulsifier performance was first rated based on a visual observation of each test tube. This performance test is called the Water Clarity Index ("WCI"). If the separated water is clear, or free from oil, and the oil-water interface is sharp (i.e. no rag is present) then the demulsifier is given a rating of a 5. Less effective demulsifiers are rated lower than 5. Ineffective demulsifiers are given a value of 1. The WCI is then multiplied by the mean water drop to calculate the performance index.

Example Set 3—Effectiveness on Different Sources of Crude

Additional exemplary formulations are shown in Table 7. The exemplary formulations may comprise 10 to 40% actives with the remainder of the formulations comprising an organic or aqueous solvent or a combination thereof. The actives may include a polyalkylene oxide triblock polyol with about 40% EO by weight and an average molecular weight, Mw of about 4,200 ("EO/PO Surf. 40% EO") and at least one alkyl phenol-formaldehyde resin alkoxylate. The EO/PO Surf. 40% EO may be present in an amount ranging from about 10 wt % to about 50 wt % based on a combined weight of the alkyl phenol-formaldehyde resin alkoxylate and the EO/PO Surf.

Suitable alkyl phenol-formaldehyde resin alkoxylates include nonylphenol formaldehyde resin alkoxylates ("NPF") and/or amylphenol formaldehyde resin alkoxylates ("APF") with a degree of polymerization ranging from about 4 to about 12 and are about 40% to about 80% ethylene oxide by weight. As shown in Table 7, one such APF may be an amylphenol formaldehyde resin alkoxylate with a degree of polymerization of about 7-8 and is about 40% ethylene oxide by weight ("APF 40% EO"). Also shown in Table 7 are suitable NPF. One such NPF may be a nonylphenol formaldehyde resin alkoxylate with a degree of polymerization of about 6-7 and is about 50% ethylene oxide by weight ("NPF 50% EO"). Another NPF may be a nonylphenol formaldehyde resin alkoxylate with a degree of polymerization of about 8-9 and is about 55% ethylene oxide by weight ("NPF 55% EO"). Another suitable NPF may be a nonylphenol formaldehyde resin alkoxylate with a degree of polymerization of about 2-8 and is about 80% ethylene oxide by weight ("NPF 80% EO"). The alkyl phenol-formaldehyde resin alkoxylates may also be adducts of at least two alkyl phenol-formaldehyde resin alkoxylates. In one embodiment, the adduct may be an adduct of a nonylphenol formaldehyde resin alkoxylate that is at least 50% ethylene oxide by weight and a butylphenol formaldehyde resin alkoxylate that is at least 50% ethylene oxide by weight ("NPF/BPF"). In other words, the NPF/BPF is a mixed resin with units of both nonylphenol formaldehyde alkoxylate and butylphenol formaldehyde alkoxylate.

The actives may also comprise one or more aqueous or oil-based crude oil treatments or additives to aid in demulsification. One such additive may be an ethylenediamine ethylene oxide/propylene oxide copolymer with about 40% EO by weight and an average molecular weight, Mw, of about 6,700 ("ED EO/PO"). The ED EO/PO may be present in an amount ranging from about 1 to about 10 wt % of a total weight of the demulsifying composition. Alternatively, the ED EO/PO may be present in an amount ranging from about 2 to about 4 wt % of a total weight of the demulsifying composition.

Another additive example is a wetting agent such as dodecylbenzene sulfonic acid ("DDBSA"). In one embodiment, the DDBSA may be present in an amount ranging from about 1 to about 10 wt % of a total weight of the demulsifying composition. Alternatively, the DDBSA may be present in an amount ranging from about 2 to about 4 wt %.

The efficacy of similar demulsifying formulations was tested on U.S. and Canadian crude oils. The formulations tested are listed in Table 8.

All the formulations in Table 8 comprised a surfactant that was a polyalkylene oxide triblock polyol with about 40% EO by weight and an average molecular weight, Mw of about 4,200 ("EO/PO Surf. 40% EO") and at least one alkyl phenol-formaldehyde resin alkoxylate (see Table 8). Comparative example 3.2 (Comp 3.2") comprised an amylphenol formaldehyde resin alkoxylate with a degree of polymerization of about 7-8 and was about 40% EO by weight ("APF 40% EO"). All the rest of the formulations tested comprised at least one nonylphenol formaldehyde resin alkoxylate ("NPF"). The first NPF was a nonylphenol formaldehyde resin alkoxylate with a degree of polymerization of about 6-7 and was about 50% ethylene oxide by weight ("NPF 50% EO"). The second NPF was a nonylphenol formaldehyde resin alkoxylate with a degree of polymerization of about 8-9 and was about 55% ethylene oxide by weight ("NPF 55% EO"). The third NPF was a nonylphenol formaldehyde resin alkoxylate with a degree of polymerization of about 2-8 and was about 80% ethylene oxide by weight ("NPF 80% EO").

Comparative examples 3.1 and 3.2 ("Comp 3.1" and "Comp 3.2" respectively) have no water in the formulations. Comp 3.2 also comprised an oil-soluble surfactant that was a polyalkylene oxide triblock polyol with about 10% EO and an average molecular weight, Mw of about 4,400 ("EO/PO Surf. 10% EO").

The resulting formulations, Examples 3.1 through 3.4 (i.e. Ex 3.1-Ex 3.4), all had water in the formulations and were stable, micellar solutions that did not separate when stored at ambient temperature for more than 30 days. Examples 3.1 through 3.4 also included an ethylenediamine ethylene oxide/propylene oxide copolymer ("ED EO/PO") that was about 40% EO by weight and had an average molecular weight, Mw, of about 6,700.

TABLE 7

DEMULSIFIER FORMULATIONS

Raw Materials (wt %)

| | Actives | | | | | | Solvents | | |
|---|---|---|---|---|---|---|---|---|---|
| APF | NPF | | | EO/PO | | | | | |
| 40% EO | NPF 55% EO | 80% EO | NPF/BPF | ED EO/PO | Surf. 40% EO | DDBSA | Heavy Naph. | $C_8H_{18}O_3$ | $H_2O$ |
| Ex A | 10.70 | 10.70 | | 3.43 | 5.14 | | 55.03 | 15.00 | |
| Ex B | 7.13 | 7.13 | | 2.29 | 3.43 | | 65.02 | 15.00 | |
| Ex C | 7.14 | 7.14 | | 2.29 | 3.43 | | | 20.00 | 60.00 |
| Ex D | 3.57 | 3.57 | | 1.15 | 1.71 | | | 20.00 | 70.00 |
| Ex E | 7.14 | 7.14 | | 2.29 | 4.43 | 3.00 | | 15.00 | 62.00 |
| Ex F | 3.57 | 3.57 | | 1.15 | 1.71 | 3.00 | | 15.00 | 72.00 |
| Ex G | 7.14 | 7.14 | | | 2.29 | 3.43 | | | 20.00 | 60.00 |
| Ex H | 3.57 | 3.57 | | | 1.15 | 1.71 | | | 20.00 | 70.00 |
| Ex I | 7.14 | 7.14 | | | 2.29 | 3.43 | 3.00 | | 15.00 | 62.00 |
| Ex J | 3.57 | 3.57 | | | 1.15 | 1.71 | 3.00 | | 15.00 | 72.00 |
| Ex K | | | 22.50 | 7.50 | | 5.00 | | | | 65.00 |
| Ex J | | | 22.50 | 7.50 | | 5.00 | | | 5.00 | 60.00 |

Note:
$C_8H_{18}O_3$ is diethylene glycol butyl ether (butyl carbitol)

TABLE 8

DEMULSIFIER FORMULATIONS

Raw Materials (wt %)

| | Actives | | | | | | Solvents | | | | |
|---|---|---|---|---|---|---|---|---|---|---|---|
| APF | NPF | NPF | NPF | EO/PO | EO/PO | | | | | | |
| 40% EO | 50% EO | 55% EO | 80% EO | ED EO/PO | Surf. 10% EO | Surf. 40% EO | Heavy Naph. | Light Naph. | $C_6H_{14}O_2$ | $C_8H_{18}O_3$ | $H_2O$ |
| Comp 3.1 | 27.0 | 23.5 | | | | 4.5 | 45.0 | | | | |
| Comp 3.2 | 28.0 | | | | 6.0 | 6.0 | 30.0 | 20.0 | 10.0 | | |
| Ex 3.1 | | 12.5 | 12.5 | 4.0 | | 6.0 | 55.0 | | | | 10.0 |
| Ex 3.2 | | 12.5 | 12.5 | 4.0 | | 6.0 | | | | 5.0 | 60.0 |
| Ex 3.3 | 12.5 | 12.5 | | 4.0 | | 6.0 | 55.0 | | | | 10.0 |
| Ex 3.4 | 12.5 | 12.5 | | 4.0 | | 6.0 | | | | 5.0 | 60.0 |

Note:
$C_6H_{14}O_2$ is hexylene glycol;
$C_8H_{18}O_3$ is diethylene glycol butyl ether (butyl carbitol)

Canadian Crude and American Shale Oil Blend

A desalter process with an electric field and desalter mix valve was simulated to evaluate the effect the emulsion breaker (demulsifier) formulations in Table 8 had on breaking water and crude oil emulsions. The crude oil used was a blend of Canadian crudes and American shale oils. The Basic Sediments and Water ("BS&W") of the crude was about 50 pounds of solids per thousand barrels and 0.1 wt % water. Comp 3.1 was used as the comparative example. For these examples, 95 vol % crude oil was mixed with 5 vol % wash water (pH=7) in a test tube. Then 3 ppm by volume of a demulsifier was added to the crude oil and wash water mixture and mixed at 6,000 rpm in a blender for 2 seconds. For the sedimentation step, the mixture was allowed to settle at a temperature of about 110° C. and at an electrical field strength of 10 kV. The volume of free water (mL) was measured at 2, 4, 8, 16, and 32 minutes.

Figure 8:
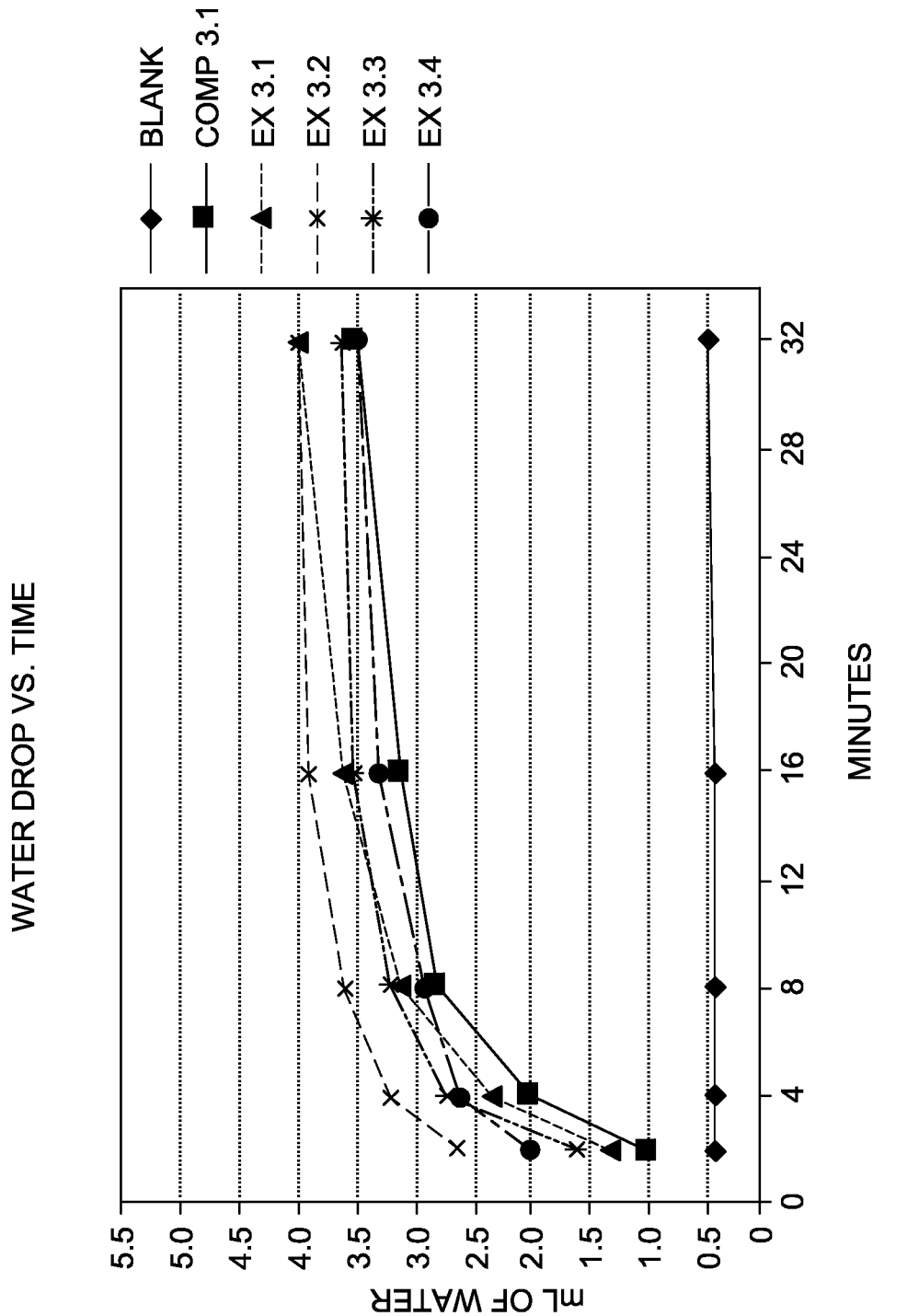
FIG. 8 depicts a graph showing water drop test results with respect to time on a Canadian Crude and American Shale Oil Blend for Comparative Formulation 3.1 and Example Formulations 3.1, 3.2, 3.3 and 3.4.
Figure 9:
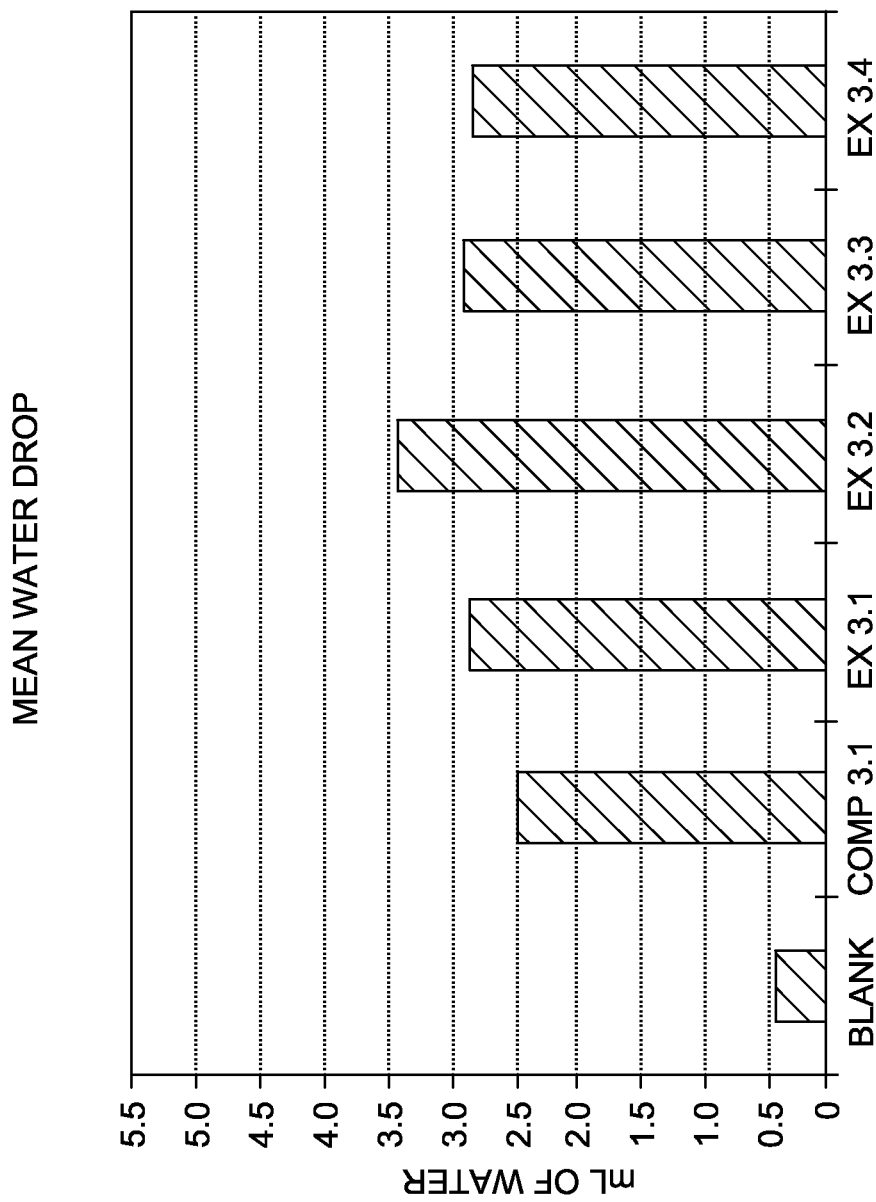
FIG. 9 depicts a bar graph showing mean water drop test results for Comparative Formulation 3.1 and Example Formulations 3.1, 3.2, 3.3 and 3.4.

The mean water drop is the average measured volume of free water. The mean water drop indicates both the speed of water drop and the amount of water that had separated from the emulsion. The water drop with respect to time for the Canadian Crude and American Shale Oil Blend is shown in FIG. 8. The mean water drop for the various demulsifier formulations are shown in FIG. 9.

Canadian Crude Oil

A desalter process with an electric field and desalter mix valve was simulated to evaluate the effect the emulsion breaker (demulsifier) formulations in Table 8 had on breaking water and crude oil emulsions. The crude oil used was Canadian crude oil from Sarnia, Ontario. The BS&W of the crude was about 50 pounds of solids per thousand barrels and 0.1 wt % water. Comp 3.2 was used as the comparative example. For these examples, 95 vol % crude oil was mixed with 5 vol % wash water (pH=7) in a test tube. Then 3 ppm by volume of a demulsifier was added to the crude oil and wash water mixture and mixed at 13,000 rpm in a blender for 4 seconds. For the sedimentation step, the mixture was allowed to settle at a temperature of about 120° C. and at an electrical field strength of 10 kV. The volume of free water (mL) was measured at 2, 4, 8, 16, and 32 minutes.

Figure 10:
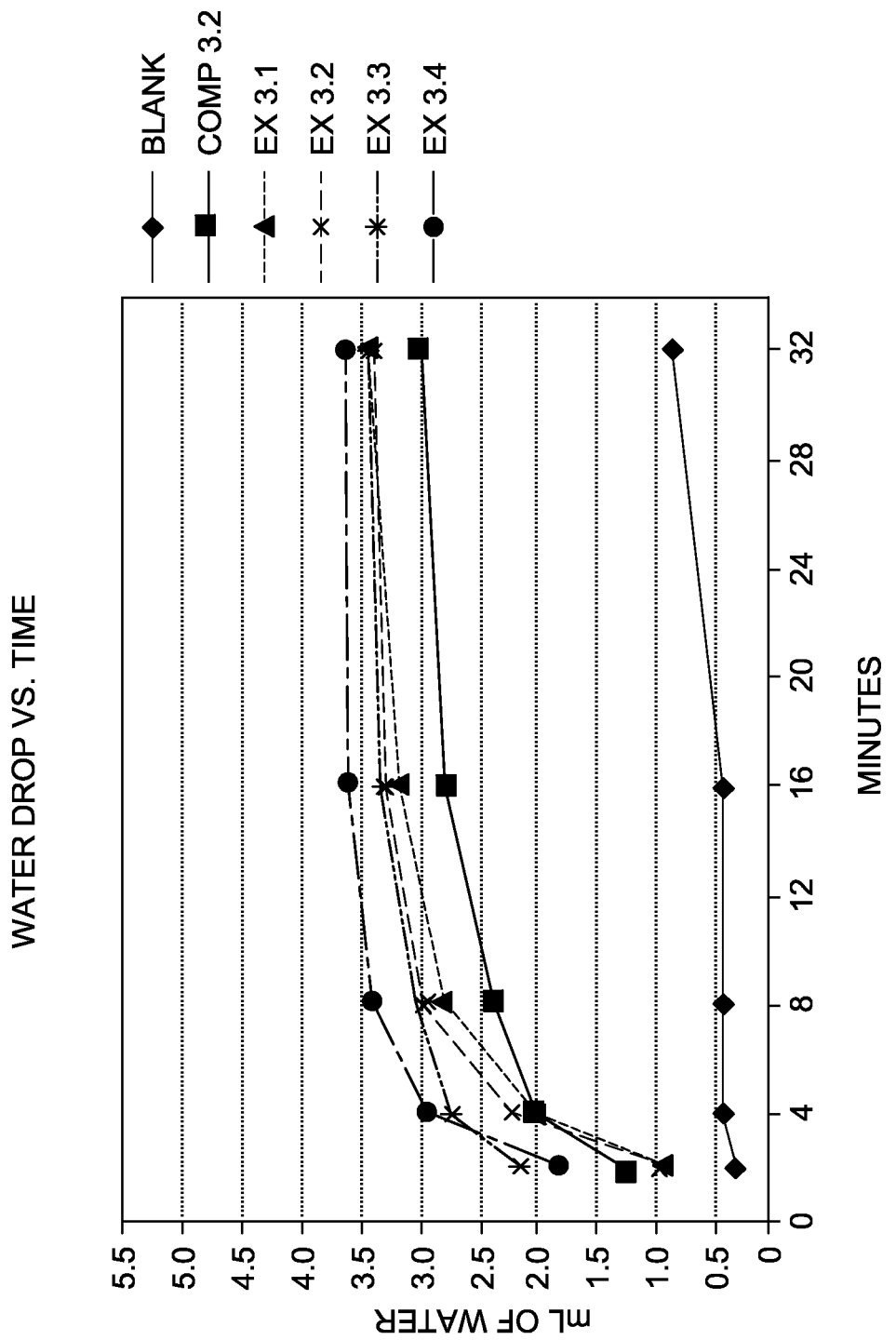
FIG. 10 depicts a graph showing water drop test results with respect to time on Canadian crude oil for Comparative Formulation 3.1 and Example Formulations 3.1, 3.2, 3.3 and 3.4.
Figure 11:
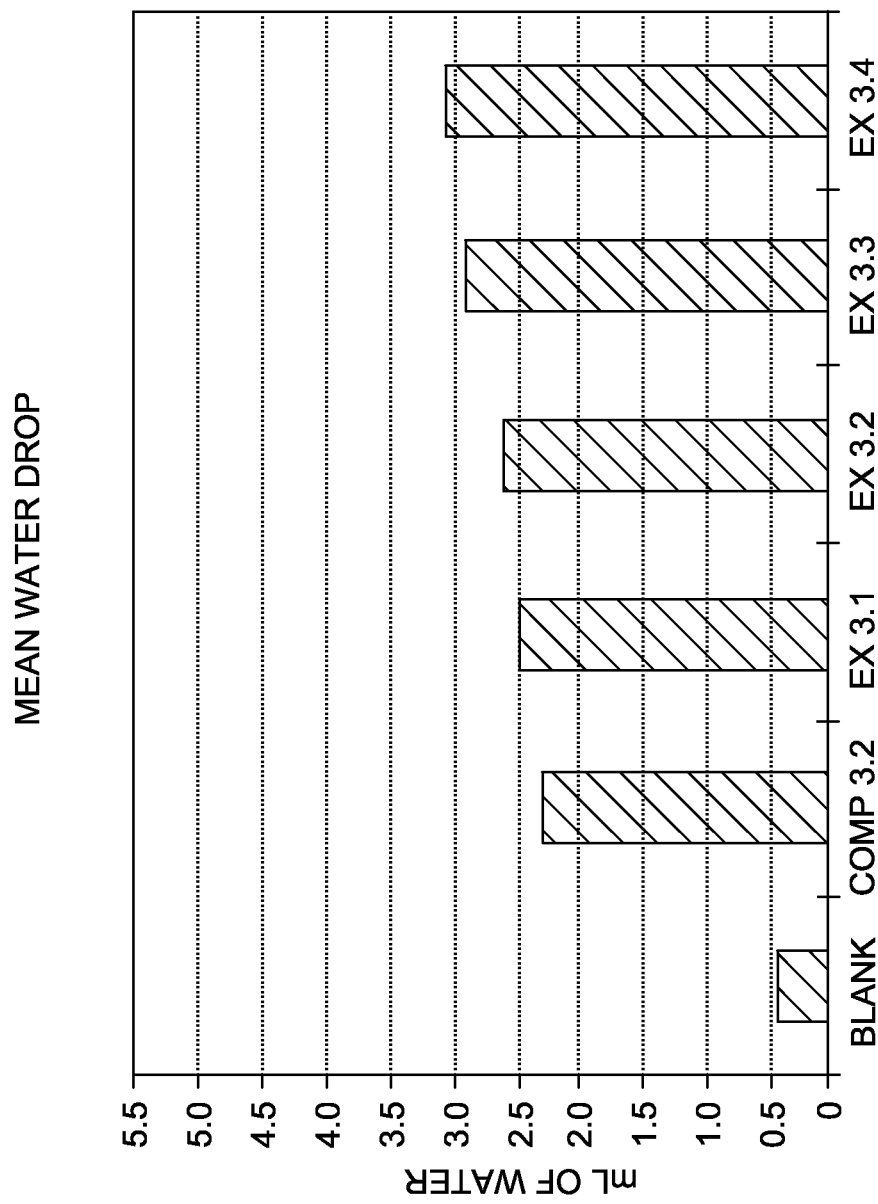
FIG. 11 depicts a bar graph showing mean water drop test results for Comparative Formulation 3.1 and Example Formulations 3.1, 3.2, 3.3 and 3.4.

The mean water drop is the average measured volume of free water. The mean water drop test indicates both the speed of water drop and the amount of water that had separated from the emulsion. The water drop with respect to time for Canadian crude oil is shown in FIG. 10. The mean water drop for the various demulsifier formulations are shown in FIG. 11.

Venezuelan Heavy Crude Oil

A desalter process with an electric field and desalter mix valve was simulated to evaluate the synergistic effect a dispersant, in this case a polyisobutenyl succinic anhydride based ester ("PiB ester"), had on breaking water and crude oil emulsions. For this test, diluted crude oil similar to Venezuelan heavy crude oil was prepared. The BS&W of the crude was about 84 pounds of solids per thousand barrels and 0.1 wt % water. Comp 3.1 was used as the comparative example. For these examples, 95 vol % crude oil was mixed with 5 vol % wash water (pH=7) in a test tube. Then 3 ppm of a demulsifier (Comp 3.1) and/or 100 ppm of a dispersant (PiBS ester) was added to the crude oil and wash water mixture and mixed at 13,000 rpm in a blender for 4 seconds.

For the sedimentation step, the mixture was allowed to settle at a temperature of about 120° C. and at an electrical field strength of 10 kV. The volume of free water (mL) was measured at 2, 4, 8, 16, and 32 minutes.

Figure 12:
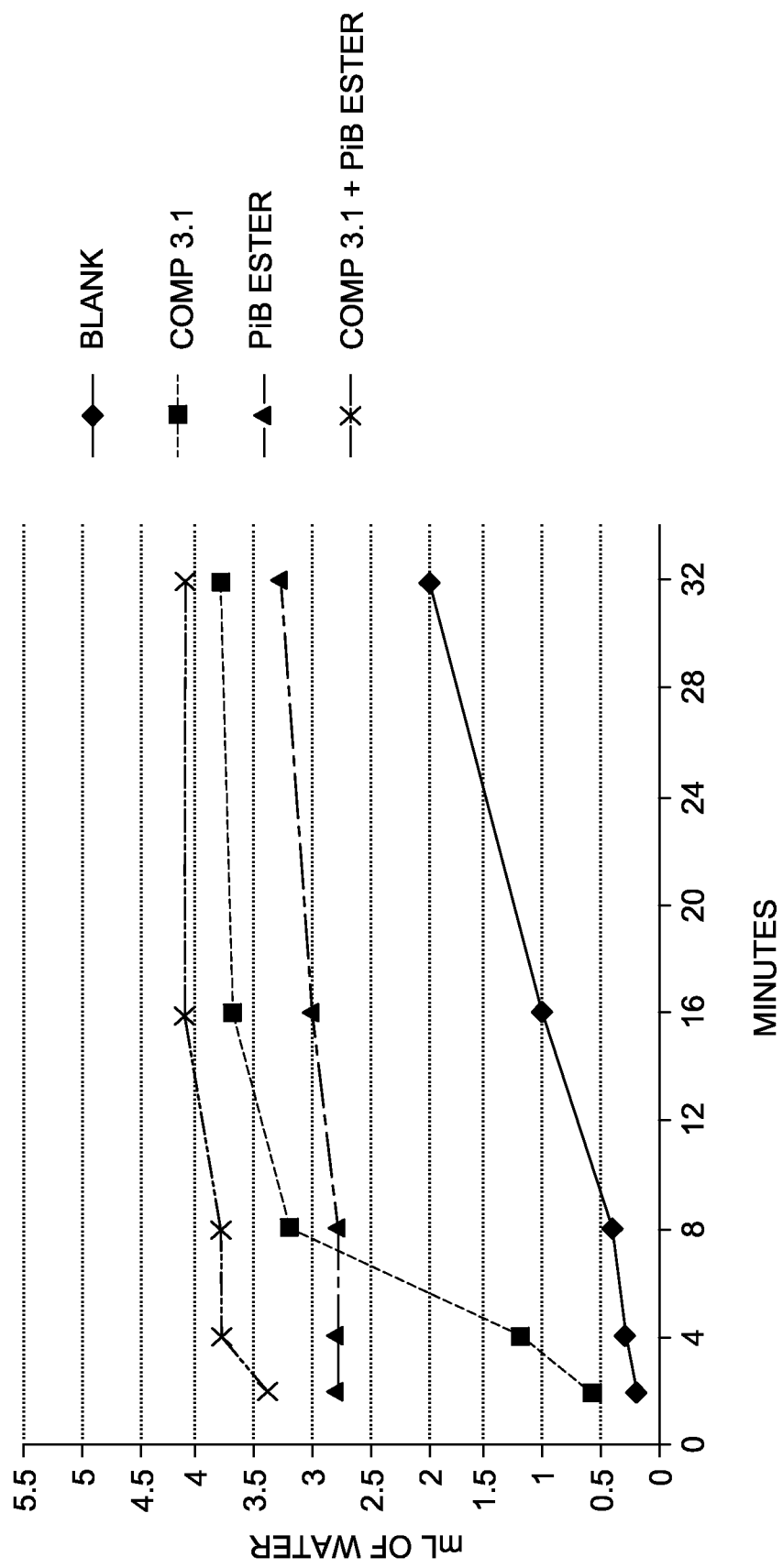
FIG. 12 depicts a graph showing water drop test results with respect to time on Venezuelan heave crude oil in Example Set 3.
Figure 13:
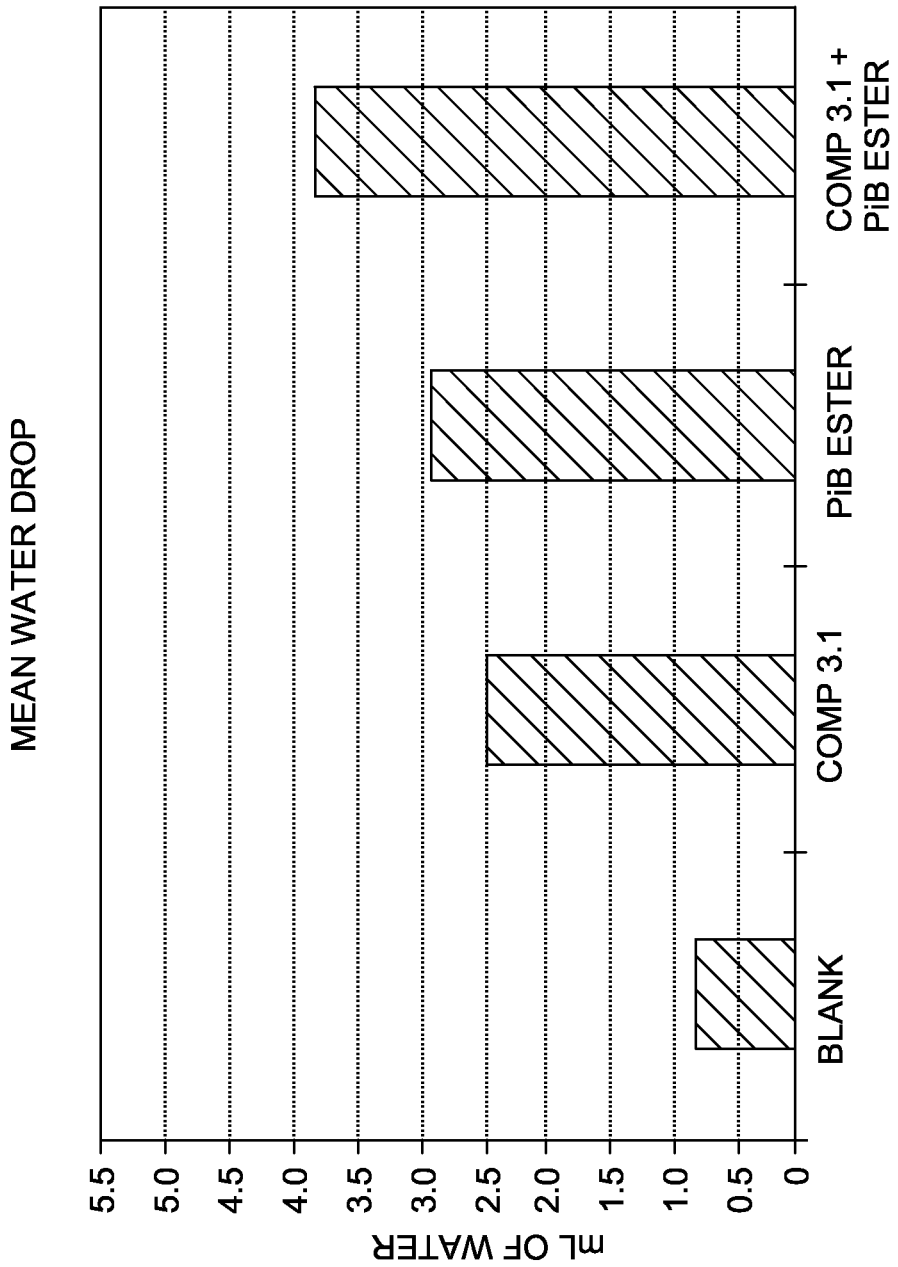
FIG. 13 depicts a bar graph showing mean water drop test results for various demulsifier and/or dispersant treatments in Example Set 3.

The mean water drop is the average measured volume of free water. The mean water drop test indicates both the speed of water drop and the amount of water that had separated from the emulsion. The water drop with respect to time for the Venezuelan heave crude oil is shown in FIG. 12. The mean water drop results for the various demulsifier and/or dispersant treatments are shown in FIG. 13.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. For example, those skilled in the art will recognize that the demulsification compositions have multiple applications, including but not limited to, oil-field or "down-hole" applications or in crude oil refining applications. Such other examples are intended to be within the scope of the claims if they have structural elements that do not differ from the literal language of the claims, or if they include equivalent structural elements with insubstantial differences from the literal languages of the claims.

What is claimed is:

1. A demulsifying composition for treating a hydrocarbon stream comprising a crude oil, the demulsifying composition comprising at least one $C_4$-$C_{12}$ alkyl phenol-formaldehyde resin alkoxylate, an oil phase, an aqueous phase, and a dispersant, wherein said demulsifying composition is colloidal, wherein said oil and aqueous phases form a colloidal micellar solution, wherein said demulsifying composition comprises 0.1 wt % to about 90 wt % water based on a total weight of said demulsifying composition, and wherein said dispersant has the following formula:

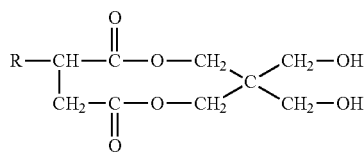

wherein R is a polyisobutenyl moiety and wherein the dispersant has a weight average molecular weight, Mw, from about 20,000 to about 25,000.

2. The demulsifying composition of claim 1, wherein the $C_4$-$C_{12}$ alkyl phenol-formaldehyde resin alkoxylate has a polymerization number of 2-20 and a degree of alkoxylation greater than about 30% and less than about 90% relative to the weight of the resin.

3. The demulsifying composition of claim 1, wherein said $C_4$-$C_{12}$ alkyl phenol-formaldehyde resin alkoxylate comprises at least two alkyl phenol-formaldehyde resin alkoxylates having different amounts of alkoxylation, and wherein the two alkyl phenol-formaldehyde resin alkoxylates comprise a first alkyl phenol-formaldehyde resin alkoxylate, having a percent A by weight of alkoxylation, and a second alkyl phenol-formaldehyde resin alkoxylate, having a percent B by weight of alkoxylation, wherein A minus B is 10-50%, and wherein the ratio by weight the first alkyl phenol-formaldehyde resin alkoxylate relative to the second alkyl phenol-formaldehyde resin alkoxylate is 1:9 to 9:1.

4. The demulsifying composition of claim 3, wherein the demulsifying composition further comprises at least two polyalkylene oxide polyols with a degree of ethoxylation greater than about 30% and less than about 85%, wherein a first polyalkylene oxide polyol is an ethylene oxide/propylene oxide block copolymer having the formula:

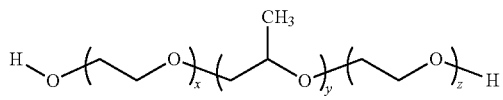

wherein x, y, and z are any integer greater than one and the molecule has a weight average molecular weight of 1000-9000; and wherein a second polyalkylene oxide polyol is an oxide block copolymer with a weight average molecular weight of 3000-25000 and 2-6 branches, each branch comprising at least one polyalkoxylate block.

5. The demulsifying composition of claim 1, wherein the demulsifying composition further comprises at least one polyalkylene oxide polyol with a degree of ethoxylation greater than about 30% and less than about 85% and a weight average molecular weight ranging from about 1000 to about 25,000, and wherein a weight ratio of said $C_4$-$C_{12}$ alkyl phenol-formaldehyde resin alkoxylate to said polyalkylene oxide polyol ranges from about 1:9 to about 9:1.

6. The demulsifying composition of claim 5, wherein the at least one polyalkylene oxide polyol comprises at least two polyalkylene oxide polyols, and wherein one of said polyalkylene oxide polyols is selected from the group consisting of ethylene oxide/propylene oxide block polymers, ethylenediamine alkoxylates, polyethylenimine alkoxylates, glycerol alkoxylates, trimethylpropane alkoxylates, and sorbitol alkoxylates.

7. The demulsifying composition of claim 6, wherein a first polyalkylene oxide polyol is an ethylene oxide/propylene oxide block copolymer having the formula:

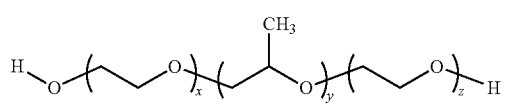

wherein x, y, and z are any integer greater than one and the molecule has a weight average molecular weight of 1000-9000; and wherein a second polyalkylene oxide polyol is an oxide block copolymer with a weight average molecular weight of 3000-25000 and 2-6 branches, each branch comprising at least one polyalkoxylate block.

8. The demulsifying composition of claim 1, wherein said composition further comprises at least one member selected from the group consisting of an acid, a non-polar organic solvent, a base, a wetting agent, a corrosion inhibitor, and a water-soluble reverse emulsion breaker.

9. The demulsifying composition of claim 8, wherein the water-soluble reverse emulsion breaker comprises a water soluble cationic polymer.

10. The demulsifying composition of claim 9, wherein the water soluble cationic polymer comprises a polyamine polymer, a dialkyldiallylammonium polymer, or an acrylamide-based polymer.

11. The demulsifying composition according to claim 8, wherein said corrosion inhibitor comprises at least one member selected from the group consisting of amidoethyl imidazoline, hydroxyethyl imidazoline, and aminoethyl imidazoline.

12. The demulsifying composition of claim 8, wherein said acid is at least one selected from the group consisting of acetic acid, citric acid, malic acid, maleic acid, succinic acid, glycolic acid, methane sulfonic acid, dodecylbenzenesulfonic acid, naphthalene sulfonic acid, and p-toluene sulfonic acid; and wherein said non-polar organic solvent is at least one selected from the group consisting of naphtha, light aromatic naphtha, heavy aromatic naphtha, pentane, cyclopentane, hexane, cyclohexane, benzene, ethyl benzene, 1,2,4-trimethyl benzene, 1,3,5-trimethyl benzene, toluene, xylene, cumene, 1,4-dioxane, chloroform, diethyl ether, methyl esters of fatty acids (biodiesel), and diethylene glycol butyl ether; and wherein said base is at least one selected from the group consisting of sodium hydroxide and potassium hydroxide; and wherein the wetting agent is at least one selected from the group consisting of sodium dioctyl sulfosuccinic acid and sodium dodecylbenzene sulfonic acid.

13. The demulsifying composition of claim 1, wherein said $C_4$-$C_{12}$ alkyl phenol-formaldehyde resin alkoxylate comprises at least one member selected from the group consisting of: a) a mixed resin with units of nonylphenol formaldehyde alkoxylate and units of butylphenol formaldehyde alkoxylate; b) a resin with units of nonylphenol formaldehyde alkoxylate; and c) a resin with units of amylphenol formaldehyde alkoxylate.

14. A demulsifying composition for treating a hydrocarbon stream comprising a crude oil, the demulsifying composition comprising at least two $C_4$-$C_{12}$ alkyl phenol-formaldehyde resin alkoxylates, an oil phase, and an aqueous phase, wherein said demulsifying composition is colloidal and said oil and aqueous phases form a colloidal micellar solution, wherein said demulsifying composition comprises 0.1 wt % to about 90 wt % water based on a total weight of said demulsifying composition and wherein said at least two $C_4$-$C_{12}$ alkyl phenol-formaldehyde resin alkoxylates have different amounts of alkoxylation, and wherein the at least two alkyl phenol-formaldehyde resin alkoxylates comprise a first alkyl phenol-formaldehyde resin alkoxylate, having a percent A by weight of alkoxylation, and a second alkyl phenol-formaldehyde resin alkoxylate, having a percent B by weight of alkoxylation, wherein A minus B is 10-50%, and wherein the ratio by weight of the first alkyl phenol-formaldehyde resin alkoxylate relative to the second alkyl phenol-formaldehyde resin alkoxylate is 1:9 to 9:1, and wherein at least one $C_4$-$C_{12}$ alkyl phenol-formaldehyde resin alkoxylate is a nonylphenol formaldehyde resin alkoxylate having a polymerization number of about 8-9 and 55% ethylene oxide by weight.

15. The demulsifying composition of claim 14, wherein each $C_4$-$C_{12}$ alkyl phenol-formaldehyde resin alkoxylate has a polymerization number of 2-20 and a degree of alkoxylation greater than about 30% and less than about 90% relative to the weight of the resin.

16. The demulsifying composition of claim 14, wherein the demulsifying composition further comprises at least one polyalkylene oxide polyol with a degree of ethoxylation greater than about 30% and less than about 85% and a weight average molecular weight ranging from about 1000 to about 25,000, and wherein a weight ratio of said at least two $C_4$-$C_{12}$ alkyl phenol-formaldehyde resin alkoxylates to said polyalkylene oxide polyol ranges from about 1:9 to about 9:1.

17. The demulsifying composition of claim 16, wherein the at least one polyalkylene oxide polyol comprises at least two polyalkylene oxide polyols, and wherein one of said polyalkylene oxide polyols is selected from the group consisting of ethylene oxide/propylene oxide block polymers, ethylenediamine alkoxylates, polyethylenimine alkoxylates, glycerol alkoxylates, trimethylpropane alkoxylates, and sorbitol alkoxylates.

18. The demulsifying composition of claim 17, wherein a first polyalkylene oxide polyol is an ethylene oxide/propylene oxide block copolymer having the formula:

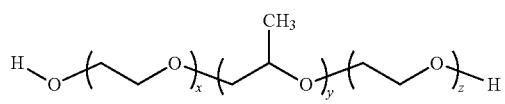

wherein x, y, and z are any integer greater than one and the molecule has a weight average molecular weight of 1000-9000; and wherein a second polyalkylene oxide polyol is an oxide block copolymer with a weight average molecular weight of 3000-25000 and 2-6 branches, each branch comprising at least one polyalkoxylate block.

19. The demulsifying composition of claim 14, wherein said composition further comprises at least one member selected from the group consisting of an acid, a non-polar organic solvent, a base, a wetting agent, a corrosion inhibitor, and a water-soluble reverse emulsion breaker.

20. The demulsifying composition of claim 19, wherein the water-soluble reverse emulsion breaker comprises a water soluble cationic polymer.

21. The demulsifying composition of claim 20, wherein the water soluble cationic polymer comprises a polyamine polymer, a dialkyldiallylammonium polymer, or an acrylamide-based polymer.

22. The demulsifying composition according to claim 19, wherein said corrosion inhibitor comprises at least one member selected from the group consisting of amidoethyl imidazoline, hydroxyethyl imidazoline, and aminoethyl imidazoline.

23. The demulsifying composition of claim 19, wherein said acid is at least one selected from the group consisting of acetic acid, citric acid, malic acid, maleic acid, succinic acid, glycolic acid, methane sulfonic acid, dodecylbenzenesulfonic acid, naphthalene sulfonic acid, and p-toluene sulfonic acid; and wherein said non-polar organic solvent is at least one selected from the group consisting of naphtha, light aromatic naphtha, heavy aromatic naphtha, pentane, cyclopentane, hexane, cyclohexane, benzene, ethyl benzene, 1,2,4-trimethyl benzene, 1,3,5-trimethyl benzene, toluene, xylene, cumene, 1,4-dioxane, chloroform, diethyl ether, methyl esters of fatty acids (biodiesel), and diethylene glycol butyl ether; and wherein said base is at least one selected from the group consisting of sodium hydroxide and potassium hydroxide; and wherein the wetting agent is at least one selected from the group consisting of sodium dioctyl sulfosuccinic acid and sodium dodecylbenzene sulfonic acid.

24. The demulsifying composition of claim 14, wherein each $C_4$-$C_{12}$ alkyl phenol-formaldehyde resin alkoxylate comprises at least one member selected from the group consisting of: a) a mixed resin with units of nonylphenol formaldehyde alkoxylate and units of butylphenol formaldehyde alkoxylate; b) a resin with units of nonylphenol formaldehyde alkoxylate; and c) a resin with units of amylphenol formaldehyde alkoxylate.

* * * * *